(12) United States Patent
Hsieh et al.

(10) Patent No.: US 8,088,846 B2
(45) Date of Patent: Jan. 3, 2012

(54) ORGANOMETALLIC COMPOSITIONS AND COATING COMPOSITIONS

(75) Inventors: Bing Hsieh, Ridgefield, CT (US); Ramanathan Ravichandran, Suffern, NY (US); Farouk Abi-Karam, Wilton, CT (US)

(73) Assignee: King Industries, Inc., Norwalk, CT (US)

( * ) Notice: Subject to any disclaimer, the term of this patent is extended or adjusted under 35 U.S.C. 154(b) by 156 days.

(21) Appl. No.: 12/233,239

(22) Filed: Sep. 18, 2008

(65) Prior Publication Data

US 2009/0011124 A1 Jan. 8, 2009

Related U.S. Application Data

(63) Continuation of application No. 11/458,015, filed on Jul. 17, 2006, now Pat. No. 7,485,729, which is a continuation-in-part of application No. 11/115,016, filed on Apr. 25, 2005, now abandoned.

(60) Provisional application No. 60/601,085, filed on Aug. 12, 2004.

(51) Int. Cl.
| | |
|---|---|
| *C08K 5/34* | (2006.01) |
| *C08K 5/10* | (2006.01) |
| *C08K 5/29* | (2006.01) |
| *C08K 5/101* | (2006.01) |
| *C08K 5/103* | (2006.01) |
| *C08K 5/3435* | (2006.01) |
| *C08K 3/34* | (2006.01) |
| *C09K 15/16* | (2006.01) |
| *C09K 15/22* | (2006.01) |
| *C08F 11/00* | (2006.01) |

(52) U.S. Cl. ........... 524/87; 524/99; 524/102; 524/103; 524/105; 524/106; 524/195; 524/315; 524/317; 524/318; 524/492; 252/389.53; 252/389.54; 252/389.61; 252/401; 252/403; 252/407

(58) Field of Classification Search ............. 252/389.53, 252/389.54, 389.61, 401, 403, 407; 524/87, 524/99, 102, 103, 105, 106, 195, 315, 317, 524/318, 492

See application file for complete search history.

(56) References Cited

U.S. PATENT DOCUMENTS

| | | | |
|---|---|---|---|
| 3,639,345 A | | 2/1972 | Whittemore et al. |
| 3,784,690 A | * | 1/1974 | Gatzi ............................. 514/631 |
| 3,923,743 A | | 12/1975 | Quiring et al. |
| 3,984,382 A | | 10/1976 | Parekh et al. |
| 4,006,124 A | | 2/1977 | Welte et al. |
| 4,044,171 A | | 8/1977 | Muller et al. |
| 4,115,320 A | | 9/1978 | Meyborg |
| 4,413,079 A | | 11/1983 | Disteldorf et al. |
| 4,463,154 A | | 7/1984 | Disteldorf et al. |
| 4,483,798 A | | 11/1984 | Disteldorf et al. |
| 4,558,076 A | | 12/1985 | Wright et al. |
| 4,614,674 A | | 9/1986 | Lauterbach |
| 4,886,838 A | * | 12/1989 | Dewhurst ...................... 521/117 |
| 5,140,068 A | | 8/1992 | Siebert et al. |
| 5,401,824 A | * | 3/1995 | Clatty et al. ..................... 528/53 |
| 5,492,955 A | | 2/1996 | Wamprecht et al. |
| 5,670,441 A | | 9/1997 | Foedde et al. |
| 5,702,581 A | | 12/1997 | Kerlin et al. |
| 5,756,634 A | | 5/1998 | Braunstein et al. |
| 5,847,044 A | | 12/1998 | Laas et al. |
| 6,907,152 B2 | | 6/2005 | Takahashi et al. |

FOREIGN PATENT DOCUMENTS

| | | |
|---|---|---|
| DE | 23 12 391 | 9/1974 |
| DE | 24 20 475 | 11/1975 |
| DE | 25 02 934 | 7/1976 |
| DE | 43 30 002 | 3/1995 |
| DE | 19 532 294 | 3/1997 |
| DE | 19 613 685 | 9/1997 |
| DE | 19 618 825 | 11/1997 |
| EP | 0 045 994 | 2/1982 |
| EP | 0 045 996 | 2/1982 |
| EP | 0 045 998 | 2/1982 |
| EP | 0 109 602 | 3/1987 |
| EP | 0 509 437 | 1/1995 |
| EP | 0 639 598 | 2/1995 |
| EP | 0 652 263 | 5/1995 |
| EP | 0 669 353 | 8/1995 |
| EP | 0 690 106 | 1/1996 |
| EP | 0 810 245 | 12/1997 |
| GB | 869988 | 6/1961 |
| GB | 890280 | 2/1962 |
| GB | 908949 | 10/1962 |
| GB | 1488631 | 10/1977 |
| JP | 08-041424 | 2/1996 |
| JP | 09-176570 | 7/1997 |

(Continued)

OTHER PUBLICATIONS

Squiller et al., "Catalysis in Aliphatic Isocyanate-Alcohol Reaction," Proceedings of the Fourteenth Water-borne and Higher-Solids Coatings Symposium, New Orleans, LA, USA, Feb. 24-27, 1987, pp. 460-477.

(Continued)

*Primary Examiner* — Kriellion Sanders

(74) *Attorney, Agent, or Firm* — Jones Day

(57) ABSTRACT

The present invention is directed to novel organometallic complexes as catalysts for the reaction of compounds with isocyanate and hydroxyl functional groups to form urethane and/or polyurethane and the process employing such catalysts. More particularly, the present invention is directed to novel complexes of zinc(II) with substituted amidines. These novel catalysts are useful for the production of urethanes and polyurethanes which are important in many industrial applications.

9 Claims, No Drawings

FOREIGN PATENT DOCUMENTS

| | | |
|---|---|---|
| WO | WO 91/07452 | 5/1991 |
| WO | WO 93/04102 | 3/1993 |
| WO | WO 95/04093 | 2/1995 |
| WO | WO 95/07377 | 3/1995 |
| WO | WO 95/08579 | 3/1995 |
| WO | WO 95/29007 | 11/1995 |
| WO | WO 96/20967 | 7/1996 |

OTHER PUBLICATIONS

Nahlovsky et al., "Catalysis of Diol Propellant Binder Cure Reactions with Isocyanates," Technology of Energetic Materials, Manufacturing and Processing—Valuation of Product Properties, 18$^{th}$ International Annual Conference of ICT 1987, Jul. 1-3, 1987, Karlsruhe, Federal Republic of Germany, pp. 39-1-39-12.

Blank et al., "Cross-linking with Polyurethanes," Polymeric Materials: Science and Engineering, Proceedings of the ACS Division of Polymeric Mateirals: Science and Engineering, vol. 63, Fall 1990, American Chemical Society, pp. 931-935.

Frisch, Jr. et al., "Novel Delayed-Action Catalyst/Co-Catalyst System for C.A.S.E. Applications," 60 Years of Polyurethanes, 1998, Technomic Publishing Co., Inc., pp. 287-303.

Antoon et al., "Crosslinking Mechanism of an Anhydride-Cured Epoxy Resin as Studied by Fourier Transform Infrared Spectroscopy," Journal of Polymer Science, vol. 19, No. 2, Feb. 1981, pp. 549-570.

Matêjka et al., "Specific Features of the Kientics of Addition Esterification of Epoxide with the Carboxyl Group," Polymer Bulletin, vol. 15, 1986, pp. 215-221.

Pettinari et al., "Ligation properties of N-substituted imidazoles: synthesis, spectroscopic and structural investigation, and behaviour in solution of zinc (II) and cadmium (II) complexes," Polyhedron, vol. 17, No. 10, 1998, pp. 1677-1691.

Smiesko et al., 2003, "Coordination and thermodynamics of stable Zn(II) complexes in the gas phase", *Journal of Biomolecular Structure and Dynamics*; 20(6):759-770.

Chen et al., 1996, "Model complexes for the carboxylate-histidine-metal triad systems in metalloenzymes. Synthesis, crystal structures and spectroscopic properties of [M(Him)$_2$(O$_2$CMe)$_2$] (M = Zn$^{II}$ or Co$^{II}$, Him = imidazole)", *Journal of the Chemical Society, Dalton Transactions*; 16(1):3465-3468.

U.S. Appl. No. 11/458,015, filed Jul. 17, 2006 (published as U.S. Patent Application Publication No. US 2006/0247341 A1).

Office Action dated Jan. 25, 2008, issued in U.S. Appl. No. 11/458,015.

Office Action dated Sep. 19, 2008, issued in U.S. Appl. No. 11/458,015.

Notice of Allowance dated Oct. 8, 2008, issued in U.S. Appl. No. 11/458,015.

\* cited by examiner

ORGANOMETALLIC COMPOSITIONS AND COATING COMPOSITIONS

This application is a continuation application of U.S. patent application Ser. No. 11/458,015, filed Jul. 17, 2006, now U.S. Pat. No. 7,485,729 which is a continuation-in-part of U.S. patent application Ser. No. 11/115,016, filed Apr. 25, 2005, now abandoned, which claims the benefit of U.S. Provisional Application 60/601,085, filed Aug. 12, 2004. All prior applications to which priority is claimed are hereby incorporated by reference in their entirety.

FIELD OF THE INVENTION

The present invention is directed to novel organometallic complexes as catalysts for the reaction of compounds with isocyanate and hydroxyl functional groups to form urethane and/or polyurethane and the process employing such catalysts. More particularly, the present invention is directed to novel complexes zinc(II) with substituted amidines. These novel catalysts are useful for the production of urethanes and polyurethanes which are important in many industrial applications, such as: coatings, foams, adhesives, sealants, and reaction injection molding (RIM) plastics.

The present invention is also directed to a method of catalyzing the process for de-blocking blocked isocyanates, like ketoxime, pyrazole or phenol blocked products to form crosslinked coatings. More particularly, the present invention relates to the use of certain novel complexes zinc (II) with substituted amidines that are effective in catalyzing both a solvent borne and a waterborne process to form such crosslinked coatings.

The present invention also relates to polyurethane powder coating compositions which are curable at low stoving temperatures and to their use for coating heat-resistant substrates.

The present invention is also directed to a catalyst for the epoxy reaction with carboxyl, anhydride, dicyandiamide (DICY), or phenolic compounds for use in coating, sealant, adhesive and casting applications.

BACKGROUND OF THE INVENTION

The reaction of isocyanate and hydroxyl compounds to form urethanes is the basis for the production of polyurethanes. Metal compounds (e.g., tin, zinc and bismuth compounds) and tertiary amines have been known to catalyze the reaction of isocyanate and hydroxyl groups to form urethane. See, Proceedings of Water Borne and High Solids Coatings Symposium, Feb. 25-27, 1987, New Orleans, at Page 460. Compounds useful for the isocyanate-hydroxyl reaction are also referred to as urethane catalysts. At present, the commercially available catalysts used in this reaction are organotin compounds (e.g., dibutyltin dilaurate and dibutyltin diacetate), zinc carboxylates, bismuth carboxylates, organomercury compounds and tertiary amines.

There are several problems with these commercially available catalysts. When they are used in the process for polyurethane coatings, the cure of the coatings under high humidity or at low temperature conditions is not satisfactory. They catalyze the undesirable side reaction of isocyanate with water to form amines and carbon dioxide. The carbon dioxide may cause blisters in the coating and the amines react with isocyanates resulting in low gloss coatings. Moreover, the cure rate at low temperatures is too slow. The commercially available catalysts also catalyze the degradation of the resulting polymer product. Furthermore, several of the commercially available urethane catalysts, particularly those containing heavy metals and tertiary amines, are highly toxic and are environmentally objectionable.

The testing of zirconium acetylacetonate and zirconium tetra-3-cyanopentanedionate, as catalysts for the isocyanate-hydroxyl reaction have been described in GB Patents 908949, 890280 and 869988. Subsequent testing by others, however, has shown that zirconium acetylacetonate is a poor catalyst for the urethane reaction. B. D. Nahlovsky and G. A. Zimmerman, Int. Jahrestag. Fraunhofer—Inst. Treib-Explosivst., 18th (Technol. Energ. Mater.), 39:1-12, reported that the catalytic efficiency of zirconium acetylacetonate for the isocyanate-hydroxyl reaction to form urethane is low. The solubility of zirconium acetylacetonate and zirconium tetra-3-cyanopentanedionate in solvents commonly used in the production of coatings is poor. Examples of such solvents include esters ketones, glycolesters and aromatic hydrocarbons, such as: butyl acetate, methyl iso-amyl ketone, 2-methoxy propylacetate, xylene and toluene. Because of the low catalytic efficiency and the poor solvent solubility, the use of these compounds as catalysts in processes involving urethane or polyurethanes have been limited.

Further testing using zirconium acetylacetonate in our laboratory has shown that zirconium compounds disclosed in the prior art, will only catalyze the isocyanate-hydroxyl reaction when carried out in a closed system, i.e., in a closed pot. This is impractical for many of the polyurethane applications. The zirconium diketonates of the prior art failed as catalysts when the reaction is carried out in the open atmosphere, unless there is present a large excess of the corresponding diketone. For zirconium acetylacetonate, the presence of over 1000 to 1 mole ratio of 2,4-pentanedione to zirconium acetylacetonate is required. However, 2,4-pentanedione and other similar diketones are volatile solvents which, when used in an open vessel, pollute the air, and pose both an environmental and a fire hazard. In addition, the presence of the free diketone causes discoloration of the catalyst, resulting in an undesirable, discolored product.

Blocked isocyanates have been used in many coating applications, such as powder coatings, electrocoatings, coil coatings, wire coatings, automotive clear top coatings, stone chip resistant primers, and textile finishes. Traditionally, these coating processes employ organic solvents, which may be toxic and/or obnoxious and cause air pollution. In recent years, the legal requirements for low or no pollution of the environment have led to an increase in the interest in waterborne and high solids coatings.

In processes wherein blocked isocyanates are used, heating to an elevated temperature is necessary to remove the blocking group from the blocked isocyanate to form free isocyanates. The free isocyanates then react with polyols (polymers containing hydroxyl functional groups) to form a crosslinked network as a thin film coating. An obstacle to the use of this process is the high temperature required to remove the blocking group. The process is extremely slow without a catalyst. It is known that metal compounds such dialkyltin and certain bismuth and zinc salts are excellent catalysts in these solvent borne coating processes. "Crosslinking with Polyurethanes." W. J. Blank, ACS Proceedings of Polymeric Materials Science and Engineering (1990) 63:931-935.

Bismuth organo-compounds have been used in a variety of processes wherein polyisocyanates or blocked isocyanates is an ingredient. For example, EP 95-109602 describes an epoxide amine adduct with a bismuth compound as being useful in a conventional cationic coating process. U.S. Pat. No. 5,702,581 describes the use of organic bismuth complexes in phosphate dip coating compositions to provide corrosion resistance. The bismuth organic complexes include bismuth carboxylates, such as bismuth lactate. WO 95/29007 disclosed the use of bismuth compounds/mercapto complexes for curing polyisocyanate organic solvent compositions. The bismuth compounds disclosed include bismuth carboxylates, nitrates and halides. WO 96/20967 also described bismuth/zinc mixture with a mercapto complex as a catalyst for producing polyurethane. See also Frisch et al., "Novel Delayed-Action Catalyst/Co-catalyst system for C.A.S.E. Applications", 60 Years Polyurethanes, Kresta et al. ed., Technomic: Lancaster, Pa. 1998, pp. 287-303. Further, WO 95/08579 described bismuth/mercapto complexes as latent catalysts in a polyol-polyisocyanate adhesive system. The catalyst is described as useful in promoting the rapid cure of the system. The bismuth carboxylates described in these references are those wherein the carboxylate has ten carbons or less in the hydrocarbon structure. These conventional bismuth carboxylates do not provide improved resin performance nor are they effective in water-borne formulations.

WO 95/07377 described the use of bismuth lactate in cationic lacquer compositions, which employ urethane reactions. A mixture of bismuth and an amino acid or amino acid precursor was disclosed for catalyzing a cationic electrodeposition of a resin film on a metal substrate. The bismuth may be present in the form of nitrates, oxides, trioxides, or hydroxide. DE 19,532,294A1 also disclosed bismuth carboxylates as catalysts for single component polyurethane lacquer coatings in a solvent borne formulation.

Unfortunately, when the known bismuth catalysts are employed in waterborne coatings formulations, it was found that they were not effective. It is suspected that the loss of activity is related to the hydrolysis of the bismuth salt in water. Moreover, even if these compounds function as catalysts in waterborne processes, it has been our experience that a very high level is necessary, usually 10 to 100 times higher than in solvent borne processes. This is undesirable because it would cause environmental pollution if a large amount is released into the environment.

Bismuth carboxylates have been used as catalysts in processes that do not involve de-blocking of blocked isocyanates. Bismuth dimethylol propionate has been disclosed in DE 93-43,300,002 as being useful in an electrocoating process for coating phosphate dipped metals to provide anti-corrosion and weather resistance. Bismuth carboxylates are also described in DE 96-19,618,825 for use in an adhesive gel formulation that is safe for contact with human skin. The formulation contains polyether polyols with hydroxyl groups, antioxidants, Bismuth(III) $C_2$-$C_{18}$ carboxylates soluble in the polyether polyols and $OCN(CH_2)_6NCO$. JP 95-351,412 describes the use of bismuth neodecanoate as a catalyst for two part adhesive formulations containing polyisocyanates, polyols with an ethylenediamine. These formulations do not involve the de-blocking of blocked isocyanates.

For waterborne processes, the catalysts known to be useful are organo-tin and lead compounds. See WO 95/04093, which describes the use of organo-tin alone or in a mixture with other compounds including bismuth oxide in a low temperature curing process employing blocked isocyanates. There is no disclosure of bismuth carboxylates alone as a catalyst for de-blocking isocyanates. Organo-tin compounds have also been used in coatings, e.g. in paints for anti-fouling applications. Organo-tin compounds in mixtures with bismuth hydroxyl carboxylic acid salt was described in DE19, 613,685. The use of bismuth lower carboxylates was described as being useful in a phosphate dip process to provide corrosion resistance to lacquer coatings. The bismuth carboxylates described therein as being useful are lower carboxylate of bismuth wherein the carboxylic acid has up to ten carbons. The substrate is then coated with an epoxy resin in the presence of a blocked isocyanate as the crosslinking agent using a zinc organo compound and/or lead compound as the catalyst. EP0, 509,437 disclosed a mixture of a dibutyltin aromatic carboxylate with bismuth and a zirconium compound as the dissociation catalyst for electrocoating wherein a blocked isocyanate is used. Polystannoxane catalysts are also described in EPO, 810,245 A1 as an low temperature catalyst for curing compositions comprising a blocked isocyanate. Bismuth compounds, including carboxylates were described as being useful as a co-catalyst. However, the process is one in which the reaction temperature was in the range of 100° C., quite a bit below the normal temperature of 120° C. to 150° C. for de-blocking blocked polyisocyanates. JP 94-194950 described a formulation for coating materials which are rapidly curable in contact with an amine catalyst vapor or mist. The coating formulation included polyols, polyisocyanates, and antimony or bismuth catalysts with mercaptans in an organic solvent. The toxicity of both lead and tin compounds presents serious environmental hazards. The use of solvents in solvent borne processes further result in the undesirable release of toxic and obnoxious chemicals into the environment. For these reasons, the use of organo tin and lead compounds and solvents has been banned in many applications and is highly restricted in electrocoating.

It is, therefore, important to develop other catalysts or catalysts systems for waterborne processes.

As environmental legislation has become ever stricter, the development of powder coatings, together with high solids lacquers and aqueous coating systems has become increasingly significant in recent years. Powder coatings release no harmful solvents during application, may be applied highly efficiently with little waste and, thus, are considered particularly environmentally friendly and economic.

Particularly high quality light and weather resistant coatings may be obtained using heat curable, polyurethane (PUR) powder coatings. The PUR powder coatings currently commercially available generally contain solid polyester polyols, which are cured with solid blocked aliphatic or, usually, cycloaliphatic polyisocyanates. However, these systems exhibit the disadvantage that the compounds used as blocking agents are released during thermal crosslinking. As a consequence, particular precautions must be taken during application both for equipment-related reasons and for environmental and occupational hygiene reasons to purify the exhaust air and/or to recover the blocking agent.

One approach to avoiding the emission of blocking agents is to use known PUR powder coating crosslinking agents containing uretdione groups as described, e.g., in DE-A 2,312,391, DE-A 2,420,475, EP-A 45,994, EP-A 45,996, EP-A 45,998, EP-A 639,598 and EP-A 669,353. These products crosslink by the thermal dissociation of uretdione groups into free isocyanate groups and the subsequent reaction of these groups with the hydroxyl-functional binder. In practice, however, uretdione powder coating crosslinking agents have only been used on an infrequent basis. The reason for this resides in the relatively low reactivity of the internally blocked isocyanate groups, which generally require stoving temperatures of at least 160° C.

Although it is known that the uretdione cleavage reaction is noticeable at temperatures as low as 100° C., especially in the presence of reactants containing hydroxyl groups, the reaction proceeds so slowly at this temperature that complete curing of coatings would take several hours, an unrealistically long period for practical use. DE-A 2,420,475, DE-A 2,502, 934 or EP-A 639,598 mention temperatures as low as 110° C., or even as low as 90° C. (DE 2,312,391), as possible stoving conditions for powder coating systems containing uretdione groups. However, the examples demonstrate that even with the powder coatings described in these publications, adequately crosslinked coatings are only obtainable at temperatures of 150° to 160° C. within practical stoving times of at most 30 minutes. Hydroxyl-terminated polyaddition compounds containing uretdione groups, as described in EP 0 669 353, require a very high baking temperature of at least 180° C., for adequate cure.

Several approaches to accelerate the curing of uretdione-crosslinking PUR powder coatings using various catalysts, have been exemplified inn various patents/publications. Several compounds have already been proposed for this purpose, for example, the organometallic compounds known from polyurethane chemistry, such as tin(II) acetate, tin(II)octoate, tin(II) ethylcaproate, tin(II) laurate, dibutyltin diacetate, dibutyltin dilaurate, dibutyltin maleate (for example EP 803 524, EP-A 45,994, EP-A 45,998, EP-A 601,079, WO 91/07452 or DE-A 2,420,475), iron(III) chloride, zinc chloride, zinc 2-ethylcaproate and molybdenum glycolate or tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane and N,N'-dimethylpiperazine (for example EP-A 639 598), N,N,N'-trisubstituted amidines (U.S. Pat. No. 5,847,044), tetra alkyl ammonium compounds and combinations with reactive compounds that are able to react with acid groups, (E. Spyrou, H. Loesch, and J. V. Weiβ, "Highly Reactive, Blocking Agent-Free Polyurethane Powder Coatings", 8$^{th}$ Nuernberg Congress, Creative Advances in Coatings Technology; Nuernberg, Germany, April, 2005, U.S. Pat. No. 6,914,115 B2), and metalloorganic carboxylate, alcoholate, or acetylacetonate and combinations of these catalysts with reactive agents such as an epoxy, or an oxazoline compound (WO 00/34355, U.S. Pat. No. 7,019,088 B1).

EP 803 524 also mentions other catalysts which have been used to date for this purpose, but without showing any particular effect on the curing temperature. They include the organometallic catalysts known from polyurethane chemistry, such as dibutyltin dilaurate (DBTL), for example, or else tertiary amines, such as 1,4-diazabicyclo[2.2.2]octane (DABCO), for example.

While EP-A 652,263, which describes the use of powder coating curing agents containing uretdione groups as an additive for powder coating compositions based on epoxy-functional copolymers and carboxyl derivatives as the crosslinking agent, do make a general reference to the two amidine bases DBN and 1,8-diazabicyclo(5.4.0)undec-7-ene (DBU) in a lengthy list of curing catalysts, the person skilled in the art could not gain any concrete indication from this disclosure that precisely these two compounds are highly effective catalysts for the dissociation of uretdione rings. This is because the working examples do not use these two catalysts, but instead an organometallic catalyst as is conventional in known PUR powder coating compositions containing uretdione groups. This reference does not recognize that the catalysts according to the present invention are particularly effective for uretdione dissociation. The low stoving temperatures for the powder systems described in EP-A 652,263 are not attributable to uretdione cleavage accelerated by catalysis with amidine bases, but are in fact within the usual range for epoxy/dicarboxylic acid systems.

While U.S. Pat. No. 5,847,044 describes a polyurethane powder coating composition, containing uretdione groups, and describes the use of N,N,N'-trisubstituted amidine catalysts, this reference does not recognize that the catalysts of the present invention are effective. Although N,N,N'-trisubstituted amidine catalysts lead to a reduction in the curing temperature, they exhibit a marked yellowing, which is generally unwanted in the coatings field. The cause of this yellowing is probably the reactive nitrogen atoms in the amidines. These can react with atmospheric oxygen to give N-oxides, which are responsible for the discoloration. It is also noteworthy that the compositions of the present invention lead to coatings with no yellowing unlike the compositions when amidine bases are used as the catalyst.

WO 00/34355 claims catalysts based on metal acetylacetonates, e.g., zinc acetylacetonate. Such catalysts are in fact able to lower the curing temperature of polyurethane powder coating compositions containing uretdione groups, but as reaction products give primarily allophanates (M. Gedan-Smolka, F. Lehmann, D. Lehmann, "New catalysts for the low temperature curing of uretdione powder coatings" *International Waterborne, High solids and Powder Coatings Symposium*, New Orleans, Feb. 21-23, 2001). Allophanates are the reaction products of one mole of alcohol and two moles of isocyanate, unlike conventional urethanes which result from the reaction of one mole of alcohol with one mole of isocyanate, leading to increased cost of the overall system.

It has been long recognized that epoxy compounds react with carboxylic acids or with anhydrides. It is also known that this reaction can be catalyzed. Antoon and Koenig (J. Polym. Sci., Polym. Chem. Ed. (1981) 19 (2):549-70) studied the mechanism of catalysis by tertiary amines of the reaction of anhydrides with epoxy resins, typically a glycidyl ether of bisphenol A. They pointed out that it is the quaternary ammonium salt zwitterion that initiated the polymerization reaction. Matejka and Dusek studied the reaction of phenylglycidyl ether model compounds with caproic acid in the presence of a tertiary amine as the catalyst (Polym. Bull. (1986) 15 (3):215-21). Based on their experimental data, they suggested that this is an addition esterification process.

Metal salts and amines have been used as catalysts for the epoxycarboxyl/anhydride reaction. For example, 1,8-Diazabicyclo[5.4.0]undec-7-ene (DBU), a strong basic amine and its salts are being promoted as catalysts for epoxy-carboxyl/anhydride polymer systems. It is known that the salts of amines usually improved the pot life of such polymer systems. Whittemore et. al. (U.S. Pat. No. 3,639,345) disclosed thermosetting resins using an epoxy functional bisphenol A and a trimellitic anhydride ester with an amine, an imidazole or an aminoalkyl phenol, as the catalyst.

Metal salts or Lewis acid catalysts are also promoted for epoxy resins. The metal salts have found applications as catalysts for epoxycarboxyl/anhydride coatings. The catalytic effect of metal salts was recognized by Connelly et. al. (ZA U.S. Pat. No. 6,907,152) who described the use of zinc acetate, chromium acetate, iron octoate, zinc naphthenate, cobalt naphthenate and manganese naphthenate as catalysts. Metal salts of Mg, Ca, Sr, Ba, Zn, Al, Sn, and Sb have been disclosed by Lauterbach (U.S. Pat. No. 4,614,674) as catalysts in combination with waxes as matting agents for powder coatings. Wright et. al. disclose (U.S. Pat. No. 4,558,076) a fast curing coating formulation comprising a carboxyl functional polymer, a tertiary amine, a polyepoxide and an Al, Ti, or Zn alkoxide or complex as the catalyst.

A major problem with the known catalysts is the poor stability of the combination of the epoxy and carboxyl/anhydride reactants at ambient room temperature. The increase in viscosity requires the epoxy and the carboxyl/anhydride compounds to be formulated into two separate packages. A further problem is the yellowing tendency of amines during the bake or heating cycle. In addition, it is known that the use of amines result in films that are sensitive to humidity leading to blistering of the film. It would be desirable to have a catalyst that does not require the separate packaging of epoxy and carboxyl/anhydride reactants and does not cause yellowing or sensitivity to humidity leading to blistering.

Metal salts such as zinc carboxylates have been shown to be effective catalysts in the above referenced patents. However, the problem with di and polyvalent metal salts is salt formation with the carboxyl groups of the reactant through ionic crosslinking leading to an instant increase in viscosity or gelation. Although covalent bonds are not formed in this process, this reaction can lead to very highly viscous formulations with poor flow quality resulting in poor film properties.

Zinc and cadmium complexes with N-substituted imidazoles have been described by Pettinari et al. (Polyhedron, (1998), 17 (10):1677-91). The complexes described are in the hydrate form and there is no discussion or suggestion of their use as catalysts in the production of polyurethane or epoxy based polymer coatings.

SUMMARY OF THE INVENTION

Classes of zinc (II) amidine complexes and compositions which effectively catalyze the reaction of epoxy-carboxyl/anhydride have been developed. The use of these catalysts in the coating process not only reduces yellowing, but also provided excellent room temperature stability and excellent humidity resistance. The improved stability with the use of the catalysts of this invention provides for the formulation of a single packaged product.

The present invention is directed to novel organometallic complexes and compositions as catalysts for the reaction of compounds with isocyanate and hydroxyl functional groups to form urethane and/or polyurethane and the process employing such catalysts. More particularly, the present invention is directed to novel complexes of zinc (II) with substituted amidines. These novel catalysts are useful for the production of urethanes and polyurethanes which are important in many industrial applications, such as: coatings, foams, adhesives, sealants, and reaction injection molding (RIM) plastics.

An objective of the present invention is an organometallic composition comprising:

(a) a metal selected from the group consisting of zinc, lithium, sodium, magnesium, barium, potassium, calcium, bismuth, cadmium, aluminum, zirconium, tin, or hafnium, titanium, lanthanum, vanadium, niobium, tantalum, tellurium, molybdenum, tungsten, cesium, (b) an amidine compound of formula I, II or III

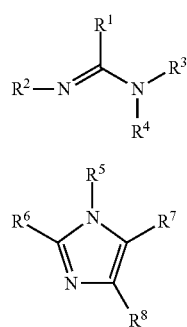

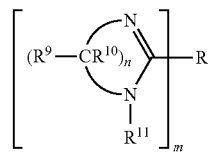

wherein $R^1$ is hydrogen, an organic group attached through a carbon atom, an amine group which is optionally substituted, or a hydroxyl group which is optionally etherified with a hydrocarbyl group having up to 8 carbon atoms;

$R^2$ and $R^3$ are each independently hydrogen or an organic group attached through a carbon atom or are joined to one another by an N=C—N linkage to form a heterocyclic ring with one or more hetero atoms or a fused bicyclic ring with one or more heteroatoms;

$R^4$ is hydrogen, an organic group attached through a carbon atom or a hydroxyl group which can be optionally etherified with a hydrocarbyl group having up to 8 carbon atoms;

$R^5$, $R^6$, $R^7$ and $R^8$ are independently hydrogen, alkyl substituted alkyl hydroxyalkyl, aryl, aralkyl, cycloalkyl, heterocyclics, ether, thioether, halogen, —$N(R)_2$, polyethylene polyamines, nitro groups, keto groups, ester groups, or carbonamide groups optionally alkyl substituted with alkyl substituted alkyl hydroxyalkyl, aryl, aralkyl, cycloalkyl, heterocycles, ether, thioether, halogen, —$N(R)_2$, polyethylene polyamines, nitro groups, keto groups or ester groups;

$R^9$, $R^{10}$ and $R^{11}$ are independently hydrogen, alkyl alkenyl or alkoxy of 1 to 36 carbons, cycloalkyl of 6 to 32 carbons, alkylamino of 1 to 36 carbon atoms, cycloalkyl of 5 to 12 carbon atoms, phenyl, hydroxyalkyl, hydroxycycloalkyl of 1 to 20 carbon atoms, methoxyalkyl of 1 to 20 carbon atoms, aralkyl of 7 to 9 carbon atoms, the aralkyl wherein the aryl group is further substituted by alkyl of 1 to 36 carbon atoms, ether, thioether, halogen, —$N(R)_2$, polyethylene polyamines, nitro groups, keto groups, ester groups, or carbonamide groups optionally alkyl substituted with alkyl substituted alkyl hydroxyalkyl, aryl, aralkyl, cycloalkyl, heterocyclics, ether, thioether, halogen, —$N(R)_2$, polyethylene polyamines, nitro groups, keto groups or ester groups; and R represents alkyl alkylene, aryl, aralkyl, cycloalkyl or heterocyclic radical, optionally substituted with halogen, nitro, alkyl alkoxy or amino, and, when m=1, R is hydrogen or a plurality of radicals optionally joined by hetero atoms O, N or S;

m=1 or 2; n=2 or 3;

(c) an aliphatic, aromatic or polymeric carboxylate with an equivalent weight of about 45 to about 465; and (d) optionally a fumed silica.

The present invention is also directed to a method of catalyzing the process for de-blocking blocked isocyanates to form crosslinked coatings. More particularly, the present invention relates to the use of certain novel complexes and compositions of zinc(II) with substituted amidines that are effective in catalyzing a solventless, a solvent borne and a waterborne process to form such cross linked coatings.

The present invention also relates to powder coatings, and liquid coatings such as coil coating, can coating, wire coating, plastic coatings. More specifically the present invention relates to a polyurethane powder coating composition containing A) a binder component which is solid below 40° C. and liquid above 130° C. and has an OH number of about 25 to about 200 and a number average molecular weight of about 400 to about 10,000, B) a polyaddition compound which is solid below 40° C. and liquid above 125° C., contains uretdione groups and optionally free isocyanate groups and is prepared from aliphatic and/or cycloaliphatic diisocyanates, and aromatic isocyanates and C) one or more catalysts containing, an organo metallic complex of zinc(II), and substituted amidines provided that components A) and B) are present in amounts such that component B) has about 0.6 to about 1.4 isocyanate groups for each hydroxyl group present in component A) and the amount of component C) is about 0.05 to about 10 wt. %, based on the total weight of the coating composition, and optionally D) an acid scavenger to react with the free carboxyl groups in the binder. The present invention also relates to the use of this powder coating composition for coating heat resistant substrates.

The present invention is also directed to a catalyst for the epoxy reaction with carboxyl and or anhydride functional compounds for use in coating, sealant, adhesive and casting applications. More particularly, the present invention is directed to the use of novel complexes and compositions of zinc (II) with substituted amidines. The use of such a Zn catalyst in the epoxy-carboxyl anhydride reaction improves the stability of the reactants at room temperature and avoids yellowing or blistering in the coating produced. Furthermore, the improved stability of the reactants in the presence of the catalyst enables a single packaged product for the epoxy-carboxy/anhydride mixture.

The objective of this invention is to develop catalysts with high catalytic efficiency for the isocyanate-hydroxyl reaction to form urethane and/or polyurethane.

A second objective of the present invention is to develop catalysts which provide improved cure at a lower temperature and is less sensitive to the presence of water.

Another objective of the present invention is to provide catalysts for the isocyanate-hydroxyl reaction which would not catalyze the undesired side reaction of water with isocyanates or the undesired degradation of the polyurethane.

Another objective of the present invention is to provide novel PUR powder coating compositions which do not release reaction products, have increased reactivity and yield completely crosslinked coatings at distinctly lower stoving temperatures or at correspondingly shorter stoving times than previously known prior art powder coating compositions containing uretdione curing agents, without yellowing of the formulation.

This objective may be achieved with the polyurethane powder coating compositions according to the present invention which are described below in greater detail. The powder coatings according to the invention are based on the surprising observation that compounds containing certain novel complexes of zinc (II) with substituted amidines, such as heterocycles containing N,N-disubstituted, N,N'-disubstituted, or N,N,N'-trisubstituted amidine structural moieties, such as 1,5-diazabicyclo(4.3.0)non-5-ene (DBN) so strongly accelerate the dissociation of uretdione groups that PUR powder coating compositions may be formulated with them using known uretdione curing agents such that the powder coating compositions crosslink to yield high quality coatings at relatively low stoving temperatures and within a short time, with no yellowing.

The present invention also relates to coating compositions containing uretdione groups that are hardenable at low temperatures containing a) a binder having hydroxyl groups, b) a polyaddition compound having uretdione groups and optionally free isocyanate groups as a hardener, c) compounds containing certain novel complexes of zinc(II) with substituted amidines, and optionally d) auxiliary agents and additives, provided that the binder is free of carboxyl groups or the concentration of carboxyl groups is less than the concentration of active catalyst (c) or in the case of a higher concentration of carboxyl groups compared to the concentration of the catalyst (c) used, an amount of acid scavengers such as, for example, epoxies, carbodiimides, trialkylorthoformates, amine compounds, or oxazolines is added that is necessary for blocking the amount of carboxyl groups for achieving the required concentration of the active catalyst (c).

DETAILED DESCRIPTION OF THE INVENTION

In accordance with the present invention, a series of zinc catalysts used in polyurethane and epoxy coatings have been developed. The zinc catalysts are zinc complexes containing amidine and carboxylate ligands [Zn(Amidine)$_2$(Carboxylate)$_2$]. Alternatively zinc complexes containing diketone or alkylacetoacetate ligands in place of carboxylates are also effective catalysts. Further, catalysts where zinc is substituted with lithium, sodium, magnesium, barium, potassium, calcium, bismuth, cadmium, aluminum, zirconium, tin, or hafnium, titanium, lanthanum, vanadium, niobium, tantalum, tellurium, molybdenum, tungsten, cesium are also envisioned. The hardeners used in polyurethane and epoxy coatings include uretdione, free isocyanate, blocked isocyanate, or epoxy groups. The catalysts are suitable for powder, solventborne, solventless and waterborne coatings.

The component or compound containing an amidine group can for example have the formula

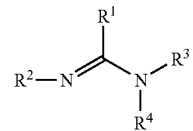

in which $R^1$ represents hydrogen, an organic group attached through a carbon atom, an amine group which can be substituted, for example by an optionally substituted hydrocarbyl group, or a hydroxyl group which can be etherified, for example with an optionally substituted hydrocarbyl group having up to 8 carbon atoms; $R^2$ and $R^3$ each independently represent hydrogen or an organic group attached through a carbon atom or are joined to one another to form (with the linking —N=C—N—) a heterocyclic ring, with one or more hetero atoms or a fused bicyclic ring with one or more heteroatoms, and $R^4$ represents hydrogen, an organic group attached through a carbon atom or a hydroxy group which can be etherified, for example with an optionally substituted hydrocarbyl group having up to 8 carbon atoms. When $R^1$ or $R^4$ is an organic group it can for example contain 1 to 40 carbon atoms or can be a polymeric group, for example having a molecular weight of 500 to 50,000. The groups $R^1$, $R^2$, $R^3$, $R^4$ could contain as substituents a total of at least two or more alcoholic hydroxyl groups.

Other representative amidines useful in this invention include N'-cyclohexyl-N,N-dimethylformamidine, N'-methyl-N,N-di-n-butylacetamidine, N'-octadecyll-N,N-dimethylformamidine, N'-cyclohexyl-N,N-dimethylvaleramidine, 1-methyl-2-cyclohexyliminopyrrolidine, 3-butyl-3,4,5,6-tetrahydropyrimidine, N-(hexyliminomethyl)morpholine, N-(α-(decylimino ethyl)ethyl)pyrrolidine, N'-decyl-N,N-dimethylformamidine, N'-dodecyl-N,N-dimethylformamidine, N'-cyclohexyl-N,N-acetamidine.

A class of amidines for use in the current invention is that in which one of the pairs $R^2$-$R^3$ or $R^2$-$R^4$ forms a 5 to 7 membered ring consisting of the two amidine nitrogen atoms and one of the pairs $R^1$-$R^3$ or $R^1$-$R^4$ forms a 5 to 9 membered ring consisting of one amidine nitrogen atom and carbon atoms. Within this class the compounds are 1,5-diazabicyclo (4.3.0)none-5-ene, 1,8-diazabicyclo(5.4.0)undec-7-ene, 1,4-diazabicyclo(3.3.0)oct-4-ene, 2-methyl-1,5-diazabicyclo (4.3.0)none-5-ene, 2,7,8-trimethyl-1,5-diazabicyclo(4.3.0) none-5-ene, 2-butyl-1,5-diazabicyclo(4.3.0)none-5-ene and 1,9-diazabicyclo(6.5.0)tridec-8-ene.

Particular catalytic amidine groups are those in which the groups $R^2$ and $R^3$ are joined to form (with the linking —N=C—N—) a heterocyclic ring, for example an imidazoline, imidazole, tetrahydropyrimidine, dihydropyrimidine or pyrimidine ring. Acyclic amidines and guanidines can alternatively be used.

Imidazole derivatives of the general formula

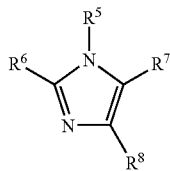

where $R^5$, $R^6$, $R^7$, and $R^8$ are independently represent hydrogen, alkyl, or substituted alkyl, hydroxyalkyl, aryl, aralkyl, cycloalkyl, heterocyclics, ether, thioether, halogen, —N(R)$_2$, polyethylene polyamines, nitro groups, keto groups, ester groups, or carbonamide groups, alkyl substituted with the various functional groups described above.

Imidazole structures useful in this invention include, N-(2-Hydroxyethyl)imidazole, N-(3-Aminopropyl)imidazole, 4-(hydroxymethyl)Imidazole, 1-(tert-butoxycarbonyl)imidazole, Imidazole-4-propionic acid, 4-carboxyimidazole, 1-butylimidazole, 2-methyl-4-imidazolecarboxylic acid, 4-formyl imidazole, 1-(ethoxycarbonyl)imidazole, reaction product of propylene oxide with imidazole and 2-methyl imidazole, 1-trimethylsilyl imidazole, 4-(hydroxymethyl) Imidazole hydrochloride, copolymer of 1-chloro-2,3-epoxypropane and imidazole, 1(p-toluenesulfonyl)imidazole, 1,1'-carbonylbisimidazole, 1-(2-cyanoethyl)-2-ethyl-4-methylimidazole, 2-phenyl-2-imidazoline pyromellitate, 4-(hydroxymethyl)Imidazole picrate, reaction product of 2-propenoic acid with 4,5-dihydro-2-nonyl-1H-imidazole-1-ethanol and 2-heptyl-4,5-dihydro-1H-imidazole-1-ethanol, disodium salts, 1-(cyanoethyl)-2-undecylimidazole trimellitate, 1-(2-hydroxypropyl)imidazole formate, sodium imidazolate, silver imidazolate.

Cyclic amidines imidazoline or tetrahydropyrimidine derivatives of the general formula

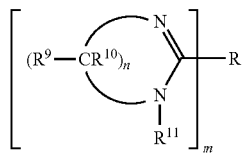

in which n=2 or 3, m=1 or 2, $R^9$, $R^{10}$ and $R^{11}$ are identical or different, and represent hydrogen, alkyl, or substituted alkyl, hydroxyalkyl, aryl, aralkyl, cycloalkyl, heterocyclics, ether, thioether, halogen, —N(R)$_2$, polyethylene polyamines, nitro groups, keto groups, ester groups, or carbonamide groups, alkyl substituted with the various functional groups described above, and R represents alkyl, alkylene, an aryl, aralkyl, cycloalkyl or heterocyclic radical, substituted if desired with halogen, nitro groups, alkyl groups, alkoxy groups or amino groups, and, when m=1, represents also hydrogen, a plurality of radicals being able to be joined, also by hetero atoms such as O, N or S, if desired. Salts of the above structures include carboxylic (aliphatic, aromatic and poly carboxylic), carbonic, sulfonic and phosphoric acid salts.

$R^9$, $R^{10}$, $R^{11}$ are independently hydrogen, alkyl, alkenyl or alkoxy of 1 to 36 carbons, cycloalkyl of 6 to 32 carbons or alkylamino of 1 to 36 carbon atoms, cycloalkyl of 5 to 12 carbon atoms, phenyl, hydroxyalkyl or hydroxycycloalkyl of 1 to 20 carbon atoms, methoxyalkyl of 1 to 20 carbon atoms, aralkyl of 7 to 9 carbon atoms, said aralkyl wherein the aryl group is further substituted by alkyl of 1 to 36 carbon atoms.

When m=2 R is alkylene of 1 to 12 carbons or arylene of 6 to 10 carbons, or a plurality of radicals being able to be joined, containing hetero atoms also by hetero atoms such as O, N or S, if desired.

In some embodiments imidazoline structures are where R is a long chain alkyl up to 18 carbon atoms, m=1 and $R^{11}$ is one of 2-hydroxyethyl, or 2-aminoethyl or 2-amido ethyl substituents.

Other imidazoline structures useful in this invention include, 1H-Imidazole-1-ethanol, 2-(8Z)-8-heptadecenyl-4,5-dihydro, 1H-Imidazole-1-ethanol, 2-(8Z)-8-heptadecenyl-4,5-dihydro, monoacetate salt, 1H-Imidazole-1-ethanol, -4,5-dihydro,-2-(9Z)-9-octadecenyl, 1H-Imidazole, 4,5-dihydro,-2-(9Z)-9-octadecenyl, oleyl hydroxyethyl imidazoline, 1H-Imidazole-1-ethanol, 4,5-dihydro-2-undecyl-, 1H-Imidazole-1-ethanol, 2(-8-heptadecenyl)-4,5-dihydro, 1-(2-hydroxyethyl)-2-tall oil alkyl-2-imidazoline, azelaic acid salt, 1H-Imidazole-1-ethanol, 2-heptadecyl-4,5-dihydro, 1H-Imidazole-1-ethanol, 2-nonyl-4,5-dihydro, 1H-Imidazole-1-ethanol, 4,5-dihydro-2-$C_{15-17}$-unsaturated alkyl derivatives, 1H-Imidazole-1-ethanol, 4,5-dihydro-2-norcoco alkyl derivatives, 1H-Imidazole-1-ethanol, 4,5-dihydro-2-nortall-oil alkyl derivatives, reaction product of 4,5-dihydro-2-nonyl 1H-Imidazole-1-ethanol, and 4,5-dihydro-2-heptyl 1H-Imidazole-1-ethanol with 2-propenoic acid, 1-propane sulfonic acid, 3-chloro-2-hydroxy-mono sodium salt reaction products with 2-(8Z)-8-heptadecenyl-4,5-dihydro 1H-Imidazole-1-ethanol, chloroacetic acid sodium salt reaction products with 1H-Imidazole-1-ethanol, 4,5-dihydro-2-norcoco alkyl derivatives, and sodium hydroxide, 2-(8-heptadecenyl)-4,5-dihydro 1H-Imidazole-1-ethanamine, 9-octadecenoic acid compound with 2-(8-heptadecenyl)-4,5-dihydro 1H-Imidazole-1-ethanamine.

As used in the present invention the term "organometallic composition" refers both to preformed organometallic complexes and to mixtures comprising metal carboxylates and amidines.

In embodiments of the present invention where the organometallic compositions are preformed metal complexes, the complexes are prepared by heating 1 mole of metal carboxylate with 2 moles of amidine in methanol. The mixture is held at about 50° C. for about 2 hours or until it becomes a clear solution. The clear solution is filtered and dried. In some embodiments, the dried catalyst is then optionally blended with fumed silica. A suitable fumed silica is Sipernat 50S from Degussa Corporation.

The present invention relates to a polyurethane powder coating composition containing:

Component A) a binder component which is solid below 40° C. and liquid above 130° C. and has an OH number of 25 to 200 and a number average molecular weight of 400 to 10,000;

Component B) a hardener which is solid below 40° C. and liquid above 125° C., contains uretdione groups and optionally free isocyanate groups and is prepared from aliphatic and/or cycloaliphatic diisocyanates; and Component C) one or more zinc catalysts of the present invention, provided that components A and B are present in amounts such that component B has about 0.6 to about 1.4 isocyanate groups for each hydroxyl group present in component A and the amount of component C is about 0.05 to about 10 wt. %, based on the total weight of the coating composition.

The present invention also relates to the use of this powder coating composition for coating heat resistant substrates.

Component A is selected from the compounds containing hydroxyl groups known from powder coating technology. Examples of these binders include polyesters, polyacrylates or polyurethanes containing hydroxyl groups. Mixtures of such resins are also suitable.

Component B is a hardener containing uretdione groups and optionally free isocyanate groups. In principle, a broad range of isocyanates are suitable for preparing uretdione-functional polyisocyanates. For example, isophorone diisocyanate (IPDI), hexamethylene diisocyanate (HDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI), methylenediphenyl diisocyanate (MDI) and tetramethylxylylene diisocyanate (TMXDI), 4,4'-diisocyanatodicyclohexylmethane, 1,3-diisocyanato-2(4)-methylcyclohexane and mixtures of these diisocyanates. HDI and IPDI are preferred.

In order to accelerate curing, the powder coatings according to the invention contain catalysts C [Zn(Amidine)$_2$(Carboxylate)$_2$]. Suitable amidine ligands in catalyst C include any substituted amidine bases bearing alkyl, aralkyl or aryl residues, in which CN double bond of the amidine structure may be arranged both as part of an open-chain molecule (such as 1,1,3,3-tetramethylguanidine, N,N-dimethyl-N'-phenylformamidine or N,N,N'-trimethylformamidine) and as a constituent of a cyclic (such as 1-methylimidazole, 1,2-dimethylimidazole, 4,4-dimethyl-2-imidazoline, or 2-methyltetrahydropyrimidines) or bicyclic system (such as 1,5-diazabicyclo[4.3.0]non-5-ene (DBN), or 1,8-diazabicyclo[5.4.0]undec-7-ene (DBU)) or also exocyclically on a ring system (such as 2-methylimino-1-methylpyrrolidone). Mixtures of amidines may also be used.

In some embodiments component C contains N,N-disubstituted, N,N'-disubstituted, or N,N,N'-trisubstituted amidine structures. For the powder coating compositions according to the invention, 1,5-diazabicyclo[4.3.0]non-5-ene (DBN, N,N,N'-trisubstituted), 1,8-diazabicyclo[5.4.0]undec-7-ene (DBU, N,N,N'-trisubstituted), 1-methylimidazole (N,N,N'-trisubstituted), 1,2-dimethylimidazole (N,N,N'-trisubstituted), 1,1,3,3-tetramethylguanidine (N,N-disubstituted), 4,4-dimethyl-2-imidazoline (N,N'-disubstituted) in catalysts C can be used.

Carboxylate ligands in catalysts C may be aliphatic or aromatic with an equivalent weight in the range of about 45 to about 465. Also the carboxylate ligand could be polymeric such as an acrylic copolymer or acid functional polyester. Catalysts C containing acetate or formate ligands may be used for the powder coating compositions according to the invention.

Diketone or the alkylacetoacetate ligands having the following structures:

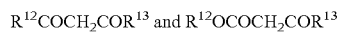

$R^{12}COCH_2COR^{13}$ and $R^{12}OCOCH_2COR^{13}$

Wherein each of $R^{12}$ and $R^{13}$ is a branched or linear $C_1$-$C_{20}$ hydrocarbon. Typical ligands or chelating agents include: 6-methyl-2,4-heptanedione (wherein $R^{12}$=$C_1$ and $R^{13}$=$C_4$), 2,2,6,6-tetramethyl-3,5-heptanedione (wherein $R^{12}$=$C_4$ and $R^{13}$=$C_4$), n-valerylacetone (wherein $R^{12}$=$C_1$ and $R^{13}$=$C_4$), n-hexanoylacetone (wherein $R^{12}$=$C_1$ and $R^{13}$=$C_5$), n-octanoylacetone (wherein $R^{12}$=$C_1$ and $R^{13}$=$C_7$), n-nonanoylacetone ($R^{12}$=$C_1$, $R^{13}$=$C_8$), n-decanoylacetone (wherein $R^{12}$=$C_1$ and $R^{13}$=$C_{11}$) and the like.

The powder coating compositions according to the invention may optionally also contain additives D which are known from powder coating technology. Examples include leveling agents, such as polyvinyl, polybutyl acrylate, or those based on polysilicones; light stabilizers such as sterically hindered amines; UV absorbers such as hydroxyphenyl triazines, hydroxyphenyl benzotriazoles, benzophenones; pigments such as titanium dioxide; and also color stabilizers to counter yellowing due to overbake, e.g., trialkyl and/or triaryl phosphites optionally containing inert substituents, such as triethyl phosphite, triphenyl phosphite and trisnonylphenyl phosphite; or other auxiliaries, as described, for example, in EP 669 353, incorporated herein by reference, in a total amount of from 0.05 to 5% by weight. This range includes all specific values and sub ranges orthoformates there between, such as 0.1, 0.2, 0.5, 1, 2, 3, and 4% by weight. Fillers and pigments such as titanium dioxide, for example, can be added in an amount of up to 50% by weight of the total composition.

The powder coating composition may also optionally contain additives E, which are acid scavengers, designed to react at elevated temperatures with the excess acid functionality present in the starting hydroxyl functional binder. The acid scavengers are able to either neutralize the free carboxylic acid functionality left in the binder resin, or react with the free carboxyl group resulting in the formation of esters. For example, acid scavengers like epoxy compounds, carbodiimides, 2-oxazolines, and trialkyl orthoformates react with acid groups to produce various esters. The epoxy compounds useful in our invention include glycidyl ether of bisphenol A or F or NOVOLAK™, phenol formaldehyde resins with a molecular weight of about 350 to 10000, preferably between 380 and 4000. These resins may be used as solids or viscous liquids. Other compounds suitable as acid scavengers include mono, di and poly glycidyl esters, the reaction products of mono, di and polycarboxylic acids with epichlorohydrin; glycidyl ethers of aliphatic ethers of diols, triols and polyols, such as 1,2,3-propanetriol glycidyl ether; alkyl($C_{10}$-$C_{16}$)glycidyl ether; lauryl glycidyl ether; glycerin 1,3-diglycidyl ether; ethylene diglycidyl ether; polyethylene glycol bis(glycidyl ether); 1,4-butanediol diglycidyl ether; 1,6-hexanediglycidyl ether; bis(2,3-epoxypropyl)ether; homo and copolymers of allyl glycidyl ether; ethoxylated alcohol($C_{12}$-$C_{14}$) glycidyl ether.

In addition to the glycidyl ether of bisphenol A and F and of phenol formaldehyde polymers, phenyl glycidyl ether, p-t-butylphenol glycidyl ether, hydroquinone diglycidyl ether, glycidyl p-glycidyloxybenzoate, p-nonylphenol glycidyl ether, glycidyl ether reaction product of 2-methyl phenol and formaldehyde polymer are also useful in the present invention.

The diglycidyl esters of di and polycarboxylic acids are also useful for the present invention. Other glycidyl functional polymers that are useful include the polymers of the glycidyl ester of methacrylic acid, epoxidized oil, cycloaliphatic epoxies and triglycidyl isocyanurate. Cycloaliphatic epoxy compounds useful for the invention include: 3,4-epoxycyclohexyl methyl 3,4-epoxycyclohexanecarboxylate, spiro[1,3-dioxane-5,3'-[7]oxabicyclo[4.1.0]

heptane], 2-(7-oxabicyclo[4.1.0]hept-3-yl), 3,4-epoxycyclohexyl)methyl 3,4-epoxycyclohexylcarboxylate, 1,2-epoxy-4-(epoxyethyl)cyclohexane, 7-Oxabicyclo[4.1.0]heptane-3,4-dicarboxylic acid, bis(oxiranylmethyl) ester, 1,3,5-triglycidyl isocyanurate (TGIC), epoxidized soybean oil, epoxidized linseed oil.

Suitable non-limiting examples of epoxies include Araldite PT 810 (TGIC), Araldite 912 (a mixture of terephthalic acid diglycidylester and trimellitic acid triglycidylester), Epikote 828 (Bisphenol A diglycidyl ether), Erisys GE-30 (trimethylolpropane triglycidylether) (TMPTGE), Suitable non-limiting examples of oxazolines include, phenylenebisoxazoline, 2-methyl-2-oxazoline, 2-hydroxyethyl-2-oxazoline, 2-hydroxypropyl-2-oxazoline, and 5-hydroxypentyl-2-oxazoline. A non-limiting example of suitable carbodiimide includes Picassian XL-701, a multifunctional polycarbodiimide. Mixtures of such substances are of course also contemplated by the invention. This reactive compound E) is only employed when acid groups are present in the powder coating composition. Where such acid groups are present in the powder coating composition, the amount of reactive component E) added is such that for each acid group there are 0.1-10 acid-scavenging units of component E). This range includes all specific values and sub ranges there between, such as 0.2, 0.5, 1, 2, 3, 5, and 8 acid-scavenging units of component E) for each acid group. It is also possible to use catalysts which accelerate this reaction, such as benzyltrimethylammonium chloride, for example, even though the catalysts of the current invention may also serve this purpose.

The finished powder coating composition is produced by intimately mixing components A, B, C, and optionally D and/or E in an edge runner mill and the mixture was then homogenized in an extruder at temperatures up to a maximum of 130° C. After cooling, the extrudate was fractionated and ground with a pin mill to a particle size of <100 μm. The powder prepared in this way was applied with an electrostatic powder spraying unit at 60 kV to degreased iron panels which are then baked in a circulating air drying cabinet at temperatures between 150° and 200° C. for 20 minutes. Good solvent and chemical resistance are obtained at considerably lower baking temperatures or shorter baking times than with comparable uretdione powder coating compositions formulated without the zinc catalysts of the present invention. In addition, the cured films are non-yellowing.

The epoxy compounds useful in our invention are the polyglycidyl ether of bisphenol A or F or NOVOLAK™, phenol formaldehyde resins with a molecular weight of about 350 to 10000, preferably between 380 and 4000. These resins may be used as solids or viscous liquids. The diglycidyl esters of di and polycarboxylic acids are also useful for the present invention. Other glycidyl functional polymers that are useful include the polymers of the glycidyl ester of methacrylic acid, epoxidized oil, cycloaliphatic epoxies and triglycidyl isocyanurate. Cycloaliphatic epoxy compounds useful for the invention include: 3,4-epoxycyclohexylmethyl 3,4-epoxycyclohexanecarboxylate, spiro[1,3-dioxane-5,3'-[7]oxabicyclo[4.1.0]heptane], 2-(7-oxabicyclo[4.1.0]hept-3-yl), 3,4-epoxycyclohexyl)methyl 3,4-epoxycyclohexylcarboxylate, 1,2-epoxy-4-(epoxyethyl)cyclohexane, 7-Oxabicyclo[4.1.0]heptane-3,4-dicarboxylic acid, bis(oxiranylmethyl) ester, 1,3,5-triglycidyl isocyanurate (TGIC), epoxidized soybean oil, epoxidized linseed oil.

Compounds with carboxyl or anhydride functional groups suitable in the present invention are the mono-di- or polycarboxyllic acids or anhydrides. Examples of acids and anhydrides suitable for the present invention are: adipic acid; glutaric acid; glutaric anhydride; sebacic acid; 1,10 decanedioic acid; fumaric acid; maleic acid and maleic anhydride; succinic acid; phthalic acid and phthalic anhydride; 8,9,10-trinorborn-5-ene-2,3-dicarboxylic acid and 8,9,10-trinorborn-5-ene-2,3-dicarboxylic anhydride; cyclohexene-1,2-dicarboxylic acid; diphenyl-2,2'-dicarboxylic acid; methylnorbornene-2,3-dicarboxylic anhydride; cyclohexene-1,2-dicarboxylic acid; tetrahydrophthalic anhydride; 5-methyltetrahydrophthalic anhydride; octahydro-4,7-methano-1H-indene-5,-dicarboxylic acid; 1,2-cyclohexanedicarboxylic acid; dimeric fatty acids; alkenyl succinic acids and anhydrides; dicarboxylic acid anhydrides such as: succinic or glutaric anhydride, alkenylsuccinates with an alkenyl group from $C_6$ to $C_{18}$; aromatic anhydrides such as: o-phthalic anhydride, trimellitic acid anhydride or linear anhydrides of diacids.

Also suitable in this invention are carboxyl containing acrylic resins obtained by polymerizing a carboxyl functional monomer such as acrylic, methacrylic, maleic, fumaric, itaconic or the half ester of maleic or fumaric with acrylic or styrene or acrylonitrile monomer. Additionally acrylic polymers with anhydride groups such as the copolymers of acrylic monomers with maleic or itaconic anhydride. Examples for tri carboxylic acids/anhydrides are 1-propene-1,2,3-tricarboxylic acid; 1,2,4-benzenetricarboxylic acid; an adduct of abietic acid with fumaric acid or maleic anhydride; trimellitic anhydride; and citric acid. Examples for monoacids are the $C_{12}$ to $C_{18}$ fatty acids saturated and unsaturated.

Other compounds suitable for the invention as crosslinkers include mono, di or poly glycidyl esters, the reaction products of mono, di and polycarboxylic acids with epichlorohydrin; glycidyl ethers of aliphatic ethers of diols, triols and polyols, such as 1,2,3-propanetriol glycidyl ether; alkyl($C_{10}$-$C_{16}$) glycidyl ether; lauryl glycidyl ether; glycerin 1,3-diglycidyl ether; ethylene diglycidyl ether; polyethylene glycol bis(glycidyl ether); 1,4-butanediol diglycidyl ether; 1,6-hexanediglycidyl ether; bis(2,3-epoxypropyl)ether; homo and copolymers of allyl glycidyl ether; ethoxylated alcohol ($C_{12}$-$C_{14}$) glycidyl ether.

Other than the glycidyl ether of bisphenol A and F and of phenol formaldehyde polymers, phenyl glycidyl ether, p-t-butylphenol glycidyl ether, hydroquinone diglycidyl ether, glycidyl p-glycidyloxybenzoate, p-nonylphenol glycidyl ether, glycidyl ether reaction product of 2-methyl phenol and formaldehyde polymer are also useful in the present invention.

It has to be understood that the use of monofunctional compounds and diluents can reduce the crosslinking density and therefore adversely affect the film properties. Therefore the use of monofunctional compounds has to be balanced with the use of higher functional crosslinkers.

The ratio of the epoxy compound to the carboxyl or anhydride in the formulation can be 0.5 to 1 to 5 to 1 depending on the crosslinking density desired. Normally the optimum crosslinking density is achieved when the ratio of functional epoxy groups and carboxyl groups is one to one under ideal conditions. However, with most epoxy formulations some self-condensation of the epoxy groups takes place. For example, it is necessary to use an excess of epoxy groups to react all the carboxyl or anhydride groups so that a film with no free carboxyl groups are present, if excellent detergent or alkali resistance in a film is desired. However, if better adhesion and flexibility is desired, then the ratio can be adjusted so that some of the unreacted carboxyl groups remain.

The ratio of epoxy to carboxyl functional groups is important for primer applications where corrosion resistance is an important requirement. In such a formulation the level of epoxy resin can be reduced. The ratio of epoxy to carboxyl groups is also dependent on the functional groups in the reactant system. For example, if one reacts a carboxyl functional acrylic resin with a difunctional epoxy resin, it might be desirable to use an excess of carboxy groups. If an acrylic resin which has a high molecular weight is used, it usually contains many carboxyl groups; a typical acrylic resin might have an acid number of 56 and a molecular weight of 20,000. In such a resin the average chain contains 20 carboxyl groups. To achieve crosslinking in such a system, theoretically three carboxyl groups have to be reacted to form an effective network. The epoxy in such a formulation might be diglycidyl ether of bisphenol A, a difunctional crosslinker. A person with skill in the coating art would therefore use an excess of carboxyl groups and a deficiency of epoxy groups to achieve a good network. Most crosslinking reactions do not go to completion. If the crosslinkers have reacted to an average to 75%, it indicates that some molecules of the crosslinking agents have completely reacted, with some molecules having reacted only at one end and some molecules having not reacted at all. By having an excess of carboxyl groups on the acrylic, one could assure a higher conversion of all the epoxy groups. This problem is typical in can coatings, where it is important to eliminate any unreacted epoxy resin to prevent any leaching of epoxy resin into the food.

Typical cure temperatures for the formulations of the present invention are between about 100 to about 300° C. for a time period from several seconds to hours. In some embodiments cure temperatures are from about 120 to about 250° C. for 30 seconds to 30 minutes.

The formulation of the present invention is useful for producing coatings, adhesive films, or in casting or molding. Typical applications include use as corrosion resistant primers for automotive applications, or can or coil coatings, or automotive clear coats. The coatings can be applied as a high solids or a powder coating.

Cationic water-borne resins or cationic electrocoating resins useful in this invention can be typically prepared by reacting a bisphenol A type epoxy resin with an epoxy equivalent weight of between about 200 to about 2000, preferably between about 400 to about 1000 with an amine. The amine can be ammonia, a secondary, primary or a tertiary amine. If ammonia is used in the preparation of the cationic resin, the reaction of the epoxy resin with ammonia has to be conducted in the presence of large excess of free ammonia to suppress gelation of the resin. In this reaction a combination of primary, secondary and tertiary amine functional resin is formed. With primary amines, depending on the ratio of amine to epoxy secondary and tertiary amine functional resins are formed. With secondary amines tertiary amine functional resins are produced. If an excess of epoxy is used and if the reaction is conducted in the presence of some water and neutralizing acid, there is also the potential for the formation of quaternary ammonium group containing resins.

Another way to prepare cationic resins is by co-polymerization of cationic monomers such as dimethyl-amino-propyl-methacrylate, dimethyl-amino-ethyl-methacrylate, dimethyl-amino-propyl-acrylamide or t-butyl-amino-ethyl-acrylate with an acrylic or methacrylic ester monomer or optionally with styrene or acrylonitrile. Other methods are the reaction of anhydride functional polymers with amines with primary or secondary and t-amine groups and a mono epoxide compound as shown in U.S. Pat. No. 3,984,382.

If a waterborne formulation is desired, an alcohol or a polyol can be solubilized or dispersed in water in the presence of nonionic groups or a nonionic surfactant. The alcohol or polyol may be incorporated in the bisphenol epoxy resin itself. For example, a bisphenol epoxy resin can be reacted with a methoxy-polyethylene glycol or a methoxy-polyethylene-ether-amine with a MW of between about 500 to about 2000.

Waterborne resin formulations suitable for this invention may also include resins dispersed in water in the presence of a nonionic surfactant. An epoxy or an acrylic or polyester resin may be dispersed in water. The nonionic groups can be a part of the resin structure or a part of an external surfactant. Commercial products, which are suitable, include dispersion in water of solid bisphenol A glycidyl resins with a molecular weight of between about 900 to about 4000.

The blocked isocyanate crosslinker useful in this invention are aromatic or aliphatic isocyanates with a blocking group, which can be removed. Often the de-blocking to the isocyanate is a displacement reaction, wherein the blocking group is displaced with another group. Typical blocking groups for the isocyanate are selected from the group consisting of malonates, triazoles, ε-caprolactam, phenols, ketoxime, pyrazoles, alcohols, glycols, glycol ethers and uretdiones.

Some typical di or polyisocyanates suitable for the invention are: hexamethylene diisocyanate, isocyanurate trimer, biuret, isophorone diisocyanate, tetramethylxylidine diisocyanate and methylene bis(phenyl isocyanate). Typical examples of blocking groups are methyl ethyl ketoxime, ε-caprolactam, 1,2,4-triazole, 3,5-dimethylpyrazole, phenol, 1,2-ethylene glycol, 1,2-propylene glycol, 2-ethylhexanol, 2-butoxyethanol, 2-methoxy(2-ethoxy ethanol).

The cationic resins suitable for the invention may also be typically dispersed in water in the presence of a suitable water soluble organic acid such as formic, acetic, glycolic or lactic acid or an inorganic acid such as sulfamic acid.

A coating formulation is normally prepared by blending and dispersing the blocked isocyanate crosslinker, the cationic resin and the catalyst of this invention in water. If pigments are added they can be dispersed separately in the resin. If neutralization of the cationic resin with an organic acid is required, the acid can be added to the resin or to the water phase. Usually high shear dispersers are used to emulsify or disperse the resin.

The catalyst of this invention is also advantageous for use in solvent borne coating formulations. Most pigmented formulations have shown a decrease of catalytic activity on aging. This reduction in catalyst activity is attributable to the presence of water on the surface of the pigment. Based on experience, it is known that catalyst deactivation takes place if the coating formulations are cured at high humidity.

The present invention is further directed to a cationic electrocoating formulation comprising a water-dispersible cationic polyol, a blocked isocyanate and a catalyst of the present invention.

The water-dispersible cationic polyol is at least di-functional, preferably tri functional or higher. The blocked isocyanate is present at a molar ratio sufficient to facilitate crosslinking. The catalyst is used at a concentration of between about 0.01 to about 5 weight percent (wt %), preferably between about 0.1 to about 1.0 wt %, of metal based on the total resin solids in the formulation.

The isocyanates useful in this invention are aliphatic, aromatic isocyanates or polyisocyanates or resins with terminal isocyanate groups. The resins may be monomeric or polymeric isocyanates. Typical monomeric isocyanates include: toluene diisocyanate (TDI), diphenylmethane diisocyanate (MDI), 1,6-hexamethylene diisocyanate (HDI), phenyl isocyanate, 4,4'-dicyclohexylmethane diisocyanate, isophorone diisocyanate (IPDI), meta-tetramethylxylene diisocyanate (TMXDI), nonanetriisocyanate (TTI) or vinyl isocyanate, or the like. The above monomeric isocyanates are those which are more commonly used and are not meant to be exclusive. The polymeric polyisocyanates useful in the invention are isocyanurate, allophanate, or biuret compounds and polyurethane products derived from the monomeric diisocyanates as listed hereinabove. Also useful are addition products of monomeric isocyanates with polyester and polyether polyols containing terminal isocyanate groups.

The polyols or resins with hydroxyl functional groups useful in this invention comprise monomeric compounds or polymeric compositions containing at least two hydroxyl groups per molecule. The molecular weight of the hydroxy containing compounds useful in this invention ranges from about 62 to about 1,000,000; the in some embodiments the range for polyols being between about 300 to about 2000 when used in solvent borne high solids coatings. Typically, the hydroxyl number of the hydroxyl containing resin can be from about 10 to about 1000. Optionally, the polyol may contain other functional groups such as carboxyl, amino, urea, carbamate, amide and epoxy groups. The polyol, a blend of polyols or a combination of polymeric polyols and monomeric diols may be employed in a solvent free system, or as a solution in an organic solvent, or as a dispersion/emulsion in water. Typical examples include: polyether polyol, polyester polyol, acrylic polyol, alkyd resin, polyurethane polyol, and the like.

The polyether polyols are the reaction products of ethylene or propylene oxide or tetrahydrofuran with diols or polyols. Polyethers derived from natural products such as cellulose and synthetic epoxy resins may also be used in this invention. Typical polyester polyols are prepared by the reaction of diols, triols or other polyols with di- or polybasic acids. Alkyds with hydroxyl functional groups are prepared in a similar process except that mono functional fatty acids may be included. Acrylic polyols are the polymerization products of an ester of acrylic or methacrylic acid with hydroxyl containing monomers such as hydroxyethyl, hydroxypropyl or hydroxybutyl ester of acrylic or methacrylic acid. These acrylic polymers can also contain other vinyl monomers such as styrene, acrylonitrile vinyl chloride and others. In addition, polyurethane polyols are also useful in this invention. These are the reaction products of polyether or polyester polyols with diisocyanates.

The polyols listed above are illustrative and are not meant to limit the scope of the invention.

Typically the polyols are either synthesized in bulk in the absence of a solvent or are prepared in the presence of a diluent or by emulsion polymerization in water. Alternatively, they may be prepared in bulk or in a solvent and then dispersed in water. For a description of the methods of preparing polyols see Organic Coatings Science Technology, vol. 1, Wiley-Interscience Co., 1992.

The concentration of the catalysts used is generally from about 0.001 wt % to about 5 wt % on total resin solids. Typically, the concentration of catalysts used is between about 0.001 to about 1.0 wt % based on the total amount of polyol and polyisocyanate, also known as binders. The catalyst concentration used is generally a compromise between pot-life of the formulation and the required cure rate.

The catalyst of the present invention is particularly suitable for applications where exceptionally fast cure is required. For example, the catalysts of the present invention is particularly useful in plural component spray gun applications wherein the catalyst is added to one of the components and the polyol and the isocyanate is mixed in situ in the spray gun. These are important in applications for roof or floor coatings, where the person applying the coating would be able to walk on the freshly applied coating a few minutes after the coating has been applied. Good cure rate is also required for coatings applied at a low temperature or in the presence of moisture, conditions where the catalyst of this invention excels.

Reactive injection molding (RIM) is another area where fast cure is essential. The reactants and catalyst are injected concurrently into a mold, and mixing is achieved during injection. In this application, fast reaction is essential to permit a short cycle time.

The ratio of NCO/OH in the formulation is in the range of about 0.1 to about 10.0 to 1, in some embodiments about 0.5 to about 2.0 to 1 depending upon the end use. For a typical high solids application, the isocyanate to hydroxyl ratio is usually about 1.0:1 to about 1.1:1. For many water-borne applications, an excess of isocyanate is required. Typically the ratio for such applications is about 1.5:1 to about 2.0:1.

The catalyst formulation can be solvent borne, high solids, 100% solids or dispersable in water. Other additives which may be utilized in the formulation to impart desired properties for specific end uses.

For most isocyanate crosslinked coatings, solvents which are free of hydroxyl groups and water are used. Typical solvents are esters, ketones, ethers and aliphatic or aromatic hydrocarbons.

The catalytic efficiency of the metal complexes of this invention is determined by measuring the drying time of the coated film or by a gel test. For drying time measurement, the liquid formulation containing polyisocyanate, polyol and catalyst was cast on a metal panel and the surface dry time and the through dry time were recorded with a circular Gardner Drying Time Recorder. For the gel test, liquid polyisocyanate, liquid polyol solution and catalyst were mixed thoroughly at room temperature. The time needed from mixing the liquid components to forming a gel (the time interval when the liquid formulation becomes non-flowable) was recorded as gel time.

The catalysts of this invention exhibit excellent catalytic efficiency, measured as drying time of the coated film and/or gel time, for the isocyanate-hydroxyl reaction compared to zirconium diketonates reported in prior art and commercially available organotin catalysts, especially at low temperatures.

The catalysts of this invention also preferentially catalyze the isocyanate-hydroxyl reaction over the isocyanate-water reaction. Organo tin does not exhibit this preferential catalysis, and also catalyze the isocyanate-water reaction, which leads to the formation of carbon dioxide and gassing. For example, to prepare a polyurethane coating with exclusive carbamate linkages, a coating formulation containing HDI based aliphatic isocyanate and a polyurethane diol with beta-carbamate was formulated. When the metal complex of the present invention was used as the catalysts, a hard glossy film was obtained. Whereas, with dibutyltin dilaurate as the catalyst, a hazy film was obtained. This is due to the competing reaction of isocyanate with moisture in the air.

Furthermore, it is known that commercial organotin urethane catalysts will affect the durability of the final product. This is due to the catalytic effect of organotin catalysts on the degradation of the polymer product. The metal complexes of the present invention show less of a catalytic effect on the degradation of the polymer than the tin urethane catalysts.

To avoid pigment adsorption or interference from other components which may deactivate the catalyst, it would be an advantage if the catalysts can be pre-blended with the isocyanate component in a two component system. However, a number of urethane catalysts also catalyze the dimerization or trimerization reactions of isocyanate and cannot be pre-blended with the isocyanate component. A solution of a polyisocyanate with the catalysts of this invention showed good compatibility and stability.

The following examples illustrate the invention and are not to be used to limit the scope of the invention.

EXAMPLES

TABLE 1

| Materials Used | Product Description, Manufacturer |
|---|---|
| ALBESTER 3870 (Component A) | OH Polyester, OH Number: 40, Hexion Specialty Chemicals |
| VESTAGON BF 1540 (Component B) | Polyisocyanate Uretdione Hardener, % NCO: 15.2%, Degussa Corporation |
| Sipernat 50s | Fumed Silica, Degussa Corporation |
| Disparlon PL-540 | Leveling Agent, King Industries, Inc. |
| Ti-Pure-TiO$_2$ R-900 | Titanium Dioxide, E.I. DuPont |
| VESTAGON B 1400 | Caprolactam Blocked Polyisocyanate Hardener, Degussa Corporation, % NCO: 12.5% |
| BUTAFLOW BT-71 | 70% DBTDL on Powder Carrier, Estron Chemical Inc. |
| Alcure 4470 | Triazole Blocked Polyisocyanate, NCO E.W.: 212, Resolution Specialty Materials |
| Acrylamac HS 232-2980 | Acrylic Polyol, 80% N.V., OH E.W.: 793.8 based on solution, Eastman Chemical Company |
| Trixene BI 7984 | HDI Trimer Blocked with MEKO, 75% N.V., NCO E.W.: 497.3 based on solution, Baxenden, UK |
| K-KAT XC-B221 | Bismuth Carboxylate, 20% Bi, King Industries, Inc. |
| Trixene BI 7982 | HDI Trimer Blocked with 3,5-Dimethylpyrazole, 70% N.V., NCO E.W.: 585.7 based on solution, Baxenden, UK |
| Mondur MR | Polymeric MDI, NCO E.W.: 134.5, Bayer Corporation |
| Bayhydrol VP LS 2235 | Waterborne Polyol, 45% N.V., % OH: 3.3, Bayer Corporation |
| Bayhydrur VP LS 2319 | Polyisocyanate, % NCO: 18.0, Bayer Corporation |
| Poly-G 76-120 | Polyol, OH E.W.: 480, Arch |
| Desmodur E743 | Polyisocyanate, NCO E.W.: 525, Bayer Corporation |
| Cocure 55 | 20% Hg, Caschem |
| ALBESTER 5040 | Carboxyl Polyester, Acid Number: 32, Resolution Specialty Materials |
| Araldite PT-810 | TGIC, Ciba Polymers |
| Benzoin | Leveling Agent, Aldrich |
| EPON 2002 | Epoxy Resin, Shell |
| AMICURE CG-1200 | DICY, Air Products |
| VESTAGON BF 1320 | Polyisocyanate Uretdione Hardener, NCO Content: 13.8%; Tg: 79° C., Degussa Corporation |
| ARALDITE PT-810 | Epoxy Acid Scavenger, TGIC, Epoxy Equivalent Weight: 99, Huntsman Corporation |
| ERISYS GE-30 | Epoxy Acid Scavenger, Trimethylolpropane Triglycidylether (TMPTGE); Epoxy Equivalent Weight: 142.5, CVC Specialty Chemicals, Inc. |
| EPIKOTE 3003 | Epoxy Resin, Epoxy Equivalent Weight: 748.5, Hexion Specialty Chemicals |
| EPIKURE 182 | Phenolic Curing Agent, Phenolic OH Equivalent Weight: 166.7, Hexion Specialty Chemicals |
| 2-Methylimidazole | Catalyst, Aldrich |

Metal Amidine Complex Preparation.

[Metal(Amidine)$_2$(Ligand)$_x$] of this invention (Component C): To a mixture of amidine (2.0 moles) and metal carboxylate, or acetylacetonate (1 mole) was added methanol to make a 50% solution. The mixture was held at 50° C. for 2 hours or until it became a clear solution. The solution was filtered and dried. The example catalysts of Metal(Amidine)$_2$(Ligand)$_x$ are listed in TABLE 2. x is the oxidation state of the metal.

TABLE 2

| Example | Catalyst | Physical Form |
|---|---|---|
| 1 | Zn(DBN*)$_2$(acetate)$_2$ | white powder |
| 2 | Zn(DBN*)$_2$(formate)$_2$ | white powder |
| 3 | Zn(DBN*)$_2$(2-ethylhexanoate)$_2$ | clear liquid |
| 4 | Zn(DBU*)$_2$(acetate)$_2$ | white powder |
| 5 | Zn(DBU*)$_2$(formate)$_2$ | white powder |
| 6 | Zn(DBU*)$_2$(2-ethylhexanoate)$_2$ | clear liquid |
| 7 | Zn(1-methylimidazole)$_2$(acetate)$_2$ | white powder |
| 8 | Zn(1-methylimidazole)$_2$(formate)$_2$ | white powder |
| 9 | Zn(1-methylimidazole)$_2$(2-ethylhexanoate)$_2$ | clear liquid |
| 10 | Zn(1,2-dimethylimidazole)$_2$(acetate)$_2$ | white powder |
| 11 | Zn(1,2-dimethylimidazole)$_2$(formate)$_2$ | white powder |
| 12 | Zn(1,2-dimethylimidazole)$_2$(2-ethylhexanoate)$_2$ | clear liquid |
| 13 | Zn(1-butylimidazole)$_2$(acetate)$_2$ | white powder |
| 14 | Zn(1-butylimidazole)$_2$(formate)$_2$ | white powder |
| 15 | Zn(1-butylimidazole)$_2$(2-ethylhexanoate)$_2$ | clear liquid |
| 16 | Zn(imidazole)$_2$(acetate)$_2$ | white powder |
| 17 | Zn(imidazole)$_2$(formate)$_2$ | white powder |
| 18 | Zn(imidazole)$_2$(2-ethylhexanoate)$_2$ | clear liquid |
| 19 | Zn(tetramethylguanidine)$_2$(acetate)$_2$ | white powder |
| 20 | Zn(tetramethylguanidine)$_2$(formate)$_2$ | white powder |
| 21 | Zn(tetramethylguanidine)$_2$(2-ethylhexanoate)$_2$ | clear liquid |
| 22 | Zn(1,3-diphenylguanidine)$_2$(acetate)$_2$ | white powder |
| 23 | Zn(1,3-diphenylguanidine)$_2$(formate)$_2$ | white powder |
| 24 | Zn(1,3-diphenylguanidine)$_2$(2-ethylhexanoate)$_2$ | clear liquid |
| 25 | Zn(4,4-dimethyl-2-imidazoline)$_2$(acetate)$_2$ | white powder |
| 26 | Zn(4,4-dimethyl-2-imidazoline)$_2$(formate)$_2$ | white powder |
| 27 | Zn(4,4-dimethyl-2-imidazoline)$_2$(2-ethylhexanoate)$_2$ | clear liquid |
| 28 | Zn(MACKAZOLINE T*)$_2$(acetate)$_2$ | brown liquid |
| 29 | Zn(MACKAZOLINE T*)$_2$(formate)$_2$ | brown liquid |
| 30 | Zn(MACKAZOLINE T*)$_2$(2-ethylhexanoate)$_2$ | brown liquid |
| 31 | Zn(Lindax-1*)$_2$(acetate)$_2$ | brown liquid |
| 32 | Zn(Lindax-1*)$_2$(formate)$_2$ | brown liquid |
| 33 | Zn(Lindax-1*)$_2$(2-ethylhexanoate)$_2$ | brown liquid |
| 34 | Zn(1-methylimidazole)$_2$(acac)$_2$ | white powder |
| 35 | Bi(1-methylimidazole)$_2$(acetate)$_3$ | white powder |
| 36 | Ca(1-methylimidazole)$_2$(acetate)$_2$ | white powder |
| 37 | Cd(1-methylimidazole)$_2$(acetate)$_2$ | white powder |
| 38 | La(1-methylimidazole)$_2$(acetate)$_3$ | white powder |
| 39 | Zr(1-methylimidazole)$_2$(acetate)$_x$(hydroxide)$_y$, x + y = 4 | white powder |
| 40 | Sn(1-methylimidazole)$_2$(2-ethylhexanoate)$_2$ | brown liquid |
| 41 | Hf(1-methylimidazole)$_2$(acac)$_4$ | yellow liquid |

*DBN: 1,5-Diazabicyclo[4.3.0]non-5-ene
DBU: 1,8-Diazabicyclo[5.4.0]undec-7-ene
Amidines, Zinc Acetate Anhydrous, and Zinc Acetylacetonate [Zn(acac)$_2$] supplied by Aldrich.
Zinc Formate Anhydrous and Zinc 2-Ethylhexanoate supplied by Alfa Aesar.
MACKAZOLINE T supplied by McIntyre Group is tall oil hydroxyethyl imidazoline.
Lindax-1 supplied by Lindau Chemicals Inc. is 1-(2-hydroxypropyl)imidazole Examples 1-4

Clear Non-Pigmented Powder Coatings Preparation

Clear Non-Pigmented Powder Coatings: ALBESTER 3870 (component A), VESTAGON BF 1540 (component B), [Zn(1-Methylimidazole)$_2$(Acetate)$_2$]/Sipernat 50S (component C), and Disparlon PL-540 leveling agent were intimately mixed in an edge runner mill and the mixture was then homogenized in an extruder at temperatures up to a maximum of 130° C. After cooling, the extrudate was fractionated and ground with a pin mill to a particle size of <100 μm. The powder prepared in this way was applied with an electrostatic powder spraying unit at 60 kV to degreased iron panels to establish film thicknesses of approximately 60 μm, which were then baked in a circulating air drying cabinet at temperatures between 150° and 200° C.

Powder Coating Compositions for Examples 1-4

Amounts in % by Weight

TABLE 3

| | Examples | | | |
|---|---|---|---|---|
| | 1 | 2 | 3 | 4 |
| ALBESTER 3870 | 78.00 | 78.00 | 78.00 | 78.00 |
| VESTAGON BF 1540 | 20.00 | 20.00 | 20.00 | 20.00 |
| Disparlon PL-540 | 2.00 | 2.00 | 2.00 | 2.00 |
| Zn(1-methylimidazole)$_2$(acetate)$_2$ | 0 | 1.00 | 3.00 | 4.00 |
| Sipernat 50S | 0 | 0.25 | 0.75 | 1.00 |

TABLE 4

| | MEK Double Rubs | | | | |
|---|---|---|---|---|---|
| Examples | 150° C. × 20' | 150° C. × 30' | 160° C. × 20' | 170° C. × 20' | 200° C. × 20' |
| 1 | — | — | — | 8 | 100+ |
| 2 | — | — | 38 | 100+ | — |
| 3 | 43 | 72 | 100+ | — | — |
| 4 | 90 | 100+ | 100+ | — | — |

TABLE 5

| Examples | Bake Schedule | 20° Gloss | 60° Gloss |
|---|---|---|---|
| 1 | 200° C. × 20' | 68 | 90 |
| 2 | 170° C. × 20' | 97 | 100 |
| 3 | 160° C. × 20' | 83 | 96 |
| 4 | 150° C. × 30' | 80 | 100 |

TABLE 6

| Examples | Bake Schedule | b* | White Index | Yellow Index |
|---|---|---|---|---|
| 1 | 200° C. × 20' | −1.92 | 88 | −4.88 |
| 2 | 170° C. × 20' | −2.61 | 94 | −6.22 |

TABLE 7

| Examples | Bake Schedule | Salt Spray (1700 Hr) | Humidity (1700 Hr) |
|---|---|---|---|
| 1 | 200° C. × 20' | 4 mm Creepage | No Blistering |
| 2 | 150° C. × 30' | 5 mm Creepage | No Blistering |

Examples 1-4 demonstrate that even at distinctly lower baking temperatures, completely crosslinked, high gloss, and non-yellowing clear non-pigmented coatings were obtained with the powder coating composition according to the invention.

Examples 5-8

White Pigmented Powder Coatings Preparation

White Pigmented Powder Coatings: ALBESTER 3870 (component A), VESTAGON BF 1540 (component B), [Zn(1-Methylimidazole)$_2$(Acetate)$_2$]/Sipernat 50S (component C), Ti-Pure-TiO$_2$ R-900, and Disparlon PL-540 leveling agent were intimately mixed in an edge runner mill and the mixture was then homogenized in an extruder at temperatures up to a maximum of 130° C. After cooling, the extrudate was fractionated and ground with a pin mill to a particle size of <100 μm. The powder prepared in this way was applied with an electrostatic powder spraying unit at 60 kV to degreased iron panels to establish film thicknesses of approximately 60 μm, which were then baked in a circulating air drying cabinet at temperatures between 150° and 200° C.

Powder Coating Compositions for Examples 5-8

Amounts in % by Weight

TABLE 8

| | Examples | | | |
|---|---|---|---|---|
| | 5 | 6 | 7 | 8 |
| ALBESTER 3870 | 52.63 | 52.63 | 52.63 | 52.63 |
| VESTAGON BF 1540 | 13.16 | 13.16 | 13.16 | 13.16 |
| Ti-Pure-TiO$_2$ R-900 | 32.89 | 32.89 | 32.89 | 32.89 |
| Disparlon PL-540 | 1.32 | 1.32 | 1.32 | 1.32 |
| Zn(1-methylimidazole)$_2$(acetate)$_2$ | 0 | 0.67 | 2.02 | 2.69 |
| Sipernat 50S | 0 | 0.17 | 0.50 | 0.67 |

TABLE 9

| Examples | Bake Schedule | MEK Double Rubs | 20° Gloss | 60° Gloss |
|---|---|---|---|---|
| 5 | 200° C. × 20' | 100+ | 82 | 93 |
| 6 | 170° C. × 20' | 100+ | 87 | 96 |
| 7 | 160° C. × 20' | 100+ | 82 | 92 |
| 8 | 150° C. × 30' | 100+ | 82 | 96 |

TABLE 10

| Examples | Bake Schedule | b* | White Index | Yellow Index |
|---|---|---|---|---|
| 5 | 200° C. × 20' | 0.12 | 89 | −0.79 |
| | 200° C. × 20' (1$^{st}$ Overbake) | 2.52 | 79 | 3.72 |
| | 200° C. × 20' (2$^{nd}$ Overbake) | 3.33 | 74 | 5.20 |
| 6 | 170° C. × 20' | −0.20 | 91 | −1.72 |
| | 170° C. × 20' (1$^{st}$ Overbake) | −0.05 | 90 | −1.12 |
| | 200° C. × 20' (2$^{nd}$ Overbake) | 0.09 | 89 | −0.89 |
| 7 | 160° C. × 20' | 0.24 | 91 | −0.40 |
| | 160° C. × 20' (1$^{st}$ Overbake) | 0.30 | 90 | −0.32 |
| | 200° C. × 20' (2$^{nd}$ Overbake) | 1.87 | 82 | 2.55 |

TABLE 10-continued

| Examples | Bake Schedule | b* | White Index | Yellow Index |
|---|---|---|---|---|
| 8 | 150° C. × 30' | 0.43 | 91 | −0.03 |
|  | 150° C. × 30' (1$^{st}$ Overbake) | 0.52 | 90 | 0.16 |
|  | 200° C. × 30' (2$^{nd}$ Overbake) | 3.23 | 77 | 5.23 |

TABLE 11

| Examples | Bake Schedule | Salt Spray (1700 Hr) | Humidity (1700 Hr) |
|---|---|---|---|
| 5 | 200° C. × 20' | 4 mm Creepage | No Blistering |
| 6 | 170° C. × 20' | 4 mm Creepage | No Blistering |
| 7 | 160° C. × 20' | 4 mm Creepage | No Blistering |
| 8 | 150° C. × 30' | 4 mm Creepage | No Blistering |

Examples 5-8 demonstrate that even at distinctly lower baking temperatures, completely crosslinked, high gloss, and non-yellowing white pigmented coatings were obtained with the powder coating composition according to the invention.

Example 9

Zinc Acetate/1-Methylimidazole Mixture Preparation

Zinc Acetate/1-Methylimidazole Mixture of this invention (Component C): To prepare a silica supported amidine, two moles of 1-methylimidazole (164.22 grams) were added drop wise to 86.92 grams of Sipernat 50S under high agitation, which produced a white powder material. The metal carboxylate zinc acetate (one Mole, 183.46 grams) was then homogeneously mixed into 1-methylimidazole carried on fumed silica mentioned above.

Clear Non-Pigmented Powder Coatings Preparation.

Clear Non-Pigmented Powder Coatings: ALBESTER 3870 (component A), VESTAGON BF 1540 (component B), Zinc Acetate/1-Methylimidazole Mixture (component C), and Disparlon PL-540 leveling agent were intimately mixed in an edge runner mill and the mixture was then homogenized in an extruder at temperatures up to a maximum of 130° C. After cooling, the extrudate was fractionated and ground with a pin mill to a particle size of <100 μm. The powder prepared in this way was applied with an electrostatic powder spraying unit at 60 kV to degreased iron panels to establish film thicknesses of approximately 60 μm, which were then baked in a circulating air drying cabinet at temperatures between 150° and 200° C.

Powder Coating Compositions for Example 9

Amounts in % by Weight

TABLE 12

|  | Examples | |
|---|---|---|
|  | 1 | 9 |
| ALBESTER 3870 | 80.72 | 80.72 |
| VESTAGON BF 1540 | 17.28 | 17.28 |
| Disparlon PL-540 | 2.00 | 2.00 |
| Zinc Acetate/1-Methylimidazole Mixture | 0 | 1.25 |

TABLE 13

| Examples | Bake Schedule | MEK Double Rubs | 20° Gloss | 60° Gloss |
|---|---|---|---|---|
| 1 | 200° C. × 20' | 100+ | 68 | 90 |
|  | 170° C. × 20' | 8 | — | — |
| 9 | 170° C. × 20' | 100+ | 91 | 100 |

TABLE 14

| Examples | Bake Schedule | b* | White Index | Yellow Index |
|---|---|---|---|---|
| 1 | 200° C. × 20' | −1.92 | 88 | −4.88 |
| 9 | 170° C. × 20' | −2.52 | 92 | −6.02 |

Examples 1 and 9 demonstrate that even at distinctly lower baking temperatures, completely crosslinked, high gloss, and non-yellowing clear non-pigmented coatings were obtained with the powder coating composition using zinc acetate/1-methylimidazole mixture as a catalyst according to the invention.

Examples 10-12

Clear Non-Pigmented Powder Coatings Preparation

Clear Non-Pigmented Powder Coatings: ALBESTER 3870 (component A), VESTAGON B 1400 (component B), [Zn(1-Methylimidazole)$_2$(Acetate)$_2$]/Sipernat 50S or BUTAFLOW BT-71 (70% DBTDL on powder carrier) (component C), and Disparlon PL-540 leveling agent were intimately mixed in an edge runner mill and the mixture was then homogenized in an extruder at temperatures up to a maximum of 130° C. After cooling, the extrudate was fractionated and ground with a pin mill to a particle size of <100 μm. The powder prepared in this way was applied with an electrostatic powder spraying unit at 60 kV to degreased iron panels to establish film thicknesses of approximately 60 μm, which were then baked in a circulating air drying cabinet at 170° C.

Powder Coating Compositions for Examples 10-12

Amounts in % by Weight

TABLE 15

|  | Examples | | |
|---|---|---|---|
|  | 10 | 11 | 12 |
| ALBESTER 3870 | 78.43 | 78.43 | 78.43 |
| VESTAGON B 1400 | 19.61 | 19.61 | 19.61 |
| Disparlon PL-540 | 1.96 | 1.96 | 1.96 |
| Zn(1-methylimidazole)$_2$(acetate)$_2$ | 0 | 1.00 | 0 |
| Sipernat 50S | 0 | 0.25 | 0 |
| DBTDL, 70% on Powder Carrier | 0 | 0 | 1.43 |

TABLE 16

| Examples | Bake Schedule | MEK Double Runs | 20° Gloss | 60° Gloss |
|---|---|---|---|---|
| 10 | 170° C. × 15' | 86 | 93 | 100 |
| 11 | 170° C. × 15' | 179 | 82 | 100 |
| 12 | 170° C. × 15' | 102 | 81 | 100 |

Examples 10-12 demonstrate that Zn(1-Methylimidazole)$_2$(Acetate)$_2$ is an effective catalyst for caprolactam blocked polyisocyanate powder coatings. Even at distinctly lower baking temperatures, completely crosslinked, and high gloss clear non-pigmented coatings were obtained with the powder coating composition according to the invention.

Example 13

Clear Non-Pigmented Powder Coatings Preparation

Clear Non-Pigmented Powder Coatings: ALBESTER 3870 (component A), Alcure 4470 (component B; triazole blocked polyisocyanate), [Zn(1-Methylimidazole)$_2$(Acetate)$_2$]/Sipernat 50S, and Disparlon PL-540 leveling agent were intimately mixed in an edge runner mill and the mixture was then homogenized in an extruder at temperatures up to a maximum of 130° C. After cooling, the extrudate was fractionated and ground with a pin mill to a particle size of <100 μm. The powder prepared in this way was applied with an electrostatic powder spraying unit at 60 kV to degreased iron panels to establish film thicknesses of approximately 60 μm, which were then baked in a circulating air drying cabinet at 160° C.

Powder Coating Compositions for Example 13

Amounts in % by Weight

TABLE 17

|  | Example 13 |
|---|---|
| ALBESTER 3870 | 84.28 |
| Alcure 4470 (Triazole Blocked) | 13.72 |
| Disparlon PL-540 | 2.00 |
| Zn(1-methylimidazole)$_2$(acetate)$_2$ | 1.00 |
| Sipernat 50S | 0.25 |

TABLE 18

| Example | Bake Schedule | MEK Double Rubs |
|---|---|---|
| 13 | 160° C. × 20' | 100+ |

Example 13 demonstrates that Zn(1-Methylimidazole)$_2$(Acetate)$_2$ is an effective catalyst for triazole blocked polyisocyanate powder coatings. Even at distinctly lower baking temperatures, completely crosslinked clear non-pigmented coatings were obtained with the powder coating composition according to the invention.

Examples 14-15

Coating Preparation: Acrylamax HS 232-2980 acrylic polyol and Trixene BI 7984 MEKO blocked HDI polyisocyanate were homogeneously mixed. The resin mixtures were catalyzed with metal catalysts listed in TABLE 19 at a concentration of 0.11% of metal based on the total resin used. Films were cast on pretreated steel panels at a dry film thickness of approximately 25 μm and baked for 20 minutes at temperatures between 130° and 150° C.

Liquid Coating Compositions for Examples 14-15

Amounts in % by Weight

TABLE 19

|  | Examples | |
|---|---|---|
|  | 14 | 15 |
| Acrylamax HS 232-2980 (Acrylic Polyol, OH E.W. = 793.8) | 61.48 | 61.48 |
| Trixene BI 7984 (HDI Trimer Blocked with MEKO, NCO E.W. = 497.3) | 38.52 | 38.52 |
| K-KAT XC B-221 (20% Bi) | 0.55 | 0 |
| Zn(1-Methylimidazole)$_2$(2-Ethylhexanoate)$_2$ (12.2% Zn) | 0 | 0.90 |

TABLE 20

|  | MEK Double Rubs | | |
|---|---|---|---|
| Examples | 130° C. × 20' | 140° C. × 30' | 150° C. × 20' |
| 14 | 14 | 100+ | 100+ |
| 15 | 33 | 100+ | 100+ |

Examples 14-15 demonstrate that Zn(1-Methylimidazole)$_2$(2-Ethylhexanoate)$_2$ is an effective catalyst for MEKO blocked HDI polyisocyanate liquid coatings. Even at distinctly lower baking temperatures, completely crosslinked coatings were obtained with the liquid coating composition according to the invention.

Examples 16-17

Coating Preparation: Acrylamax HS 232-2980 acrylic polyol and Trixene BI 7982 3,5-dimethylpyrazole blocked HDI polyisocyanate were homogeneously mixed. The resin mixtures were catalyzed with metal catalysts listed in TABLE 21 at a concentration of 0.20% of metal based on the total resin used. Films were cast on pretreated steel panels at a dry film thickness of approximately 25 μm and baked for 20 minutes at 130° C.

Liquid Coating Compositions for Examples 16-17

Amounts in % by Weight

TABLE 21

|  | Examples | |
|---|---|---|
|  | 16 | 17 |
| Acrylamax HS 232-2980 (Acrylic Polyol, OH E.W. = 793.8) | 56.35 | 56.35 |
| Trixene BI 7982 (HDI Trimer Blocked with 3,5-dimethylpyrazole, NCO E.W. = 585.7) | 43.65 | 43.65 |
| K-KAT XC B-221 (20% Bi) | 1.00 | 0 |
| Zn(1,1,3,3-Tetramethylguanidine)$_2$(2-Ethylhexanoate)$_2$ (11.3% Zn) | 0 | 1.77 |

TABLE 22

| Examples | Bake Schedule | MEK Double Runs |
|---|---|---|
| 16 | 130° C. × 20' | 100+ |
| 17 | 130° C. × 20' | 100+ |

Examples 16-17 demonstrate that Zn(1,1,3,3-Tetramethylguanidine)$_2$(2-Ethylhexanoate)$_2$ is an effective catalyst for 3,5-dimethylpyrazole blocked HDI polyisocyanate liquid coatings. Even at distinctly lower baking temperatures, completely crosslinked coatings were obtained with the liquid coating composition according to the invention.

Examples 18-19

Alcohol Blocked Isocyanate Hardener Preparation: 55.9 parts by weight of a Mondur MR (polymeric MDI, NCO E.W.=134.5) was reacted with 44.1 parts by weight of ethylene glycol monopropyl ether (104.2 g/mole) until FT-IR showed a complete disappearance of the NCO groups. The NCO equivalent of the Hardener is 240.8.

Coating Preparation Acrylamax HS 232-2980 acrylic polyol and alcohol blocked isocyanate hardner mentioned above were homogeneously mixed. The resin mixtures were catalyzed with metal catalysts listed in TABLE 23 at a concentration of 0.20% of metal based on the total resin used. Films were cast on pretreated steel panels at a dry film thickness of approximately 25 μm and baked for 20 minutes at 175° C.

Liquid Coating Compositions for Examples 18-19

Amounts in % by Weight

TABLE 23

| | Examples | |
|---|---|---|
| | 18 | 19 |
| Acrylamax HS 232-2980 (Acrylic Polyol, OH E.W. = 793.8) | 76.73 | 76.73 |
| Alcohol Blocked Isocyanate Hardner (Mondur MR Blocked with Alcohol, NCO E.W. = 240.8) | 23.27 | 23.27 |
| K-KAT XC B-221 (20% Bi) | 1.00 | 0 |
| Zn(1-Methylimidazole)$_2$(Acetate)$_2$(18.8% Zn) | 0 | 1.06 |

TABLE 24

| Examples | Bake Schedule | MEK Double Runs |
|---|---|---|
| 18 | 175° C. × 20' | 100+ |
| 19 | 175° C. × 20' | 100+ |

Examples 18-19 demonstrate that Zn(1-Methylimidazole)$_2$(Acetate)$_2$ is an effective catalyst for alcohol blocked MDI polyisocyanate liquid coatings. Completely crosslinked coatings were obtained with the liquid coating composition according to the invention.

Example 20

Coating Preparation: Bayhydrol VP LS 2235 waterborne polyol and Bayhydrur VP LS 2319 polyisocyanate were homogeneously mixed. The resin mixtures were catalyzed with Zn(1-Methylimidazole)$_2$(Acetate)$_2$ listed in TABLE 25. Films were cast on pretreated steel panels at a dry film thickness of approximately 60 μm and baked for 20 minutes at 60° C. and stored at room temperature for 2 hours.

Liquid Coating Compositions for Example 20

Amounts in % by Weight

TABLE 25

| | Example 20 |
|---|---|
| Bayhydrol VP LS 2235 (Waterborne Polyol, 45% N.V., % OH = 3.3) | 76.59 |
| Bayhydrur VP LS 2319 (Waterborne Polyisocyanate, % NCO = 18.0) (NCO E.W. = 585.7) | 23.41 |
| Zn(1-Methylimidazole)$_2$(Acetate)$_2$ | 1.00 |

TABLE 26

| Example | Bake Schedule | Mek Double Rubs |
|---|---|---|
| 20 | 60° C. × 30' + 2 hours @ RT | 100+ |

Example 20 demonstrates that Zn(1-Methylimidazole)$_2$(Acetate)$_2$ is an effective catalyst for aqueous two-component polyurethane coatings. Even at distinctly lower baking temperatures, completely crosslinked coatings were obtained with the liquid coating composition according to the invention.

Examples 21-22

Coating Preparation: Poly-G 76-120 polyol and Desmodur E743 polyisocyanate were homogeneously mixed. The resin mixtures were catalyzed with Zn(1-Methylimidazole)$_2$(2-Ethylhexanoate)$_2$ listed in TABLE 27. The gel time was measured by a Carri-Med rheometer.

Liquid Coating Compositions for Examples 21-22

Amounts in % by Weight

TABLE 27

| | Examples | |
|---|---|---|
| | 21 | 22 |
| Poly-G 76-120 (Polyol, OH E.W. = 480) | 47.00 | 47.00 |
| Desmodur E743 (Polyisocyanate, NCO E.W. = 525) | 53.00 | 53.00 |
| Cocure 55 (20% Hg) | 1.00 | 0 |
| Zn(1-Methylimidazole)$_2$(2-Ethylhexanoate)$_2$ (18.8% Zn) | 0 | 1.00 |

TABLE 28

| Example | Gel Time (minutes) |
|---|---|
| 21 | 35.4 |
| 22 | 29.2 |

Examples 21-22 demonstrate that Zn(1-Methylimidazole)$_2$(2-Ethylhexanoate)$_2$ is an effective catalyst for two-component elastomers according to the invention.

Examples 23-24

White Pigmented Powder Coatings Preparation

White Pigmented Powder Coatings: ALBESTER 5040 (component A), Araldite PT-810 TGIC (component B), [Zn(1-Methylimidazole)$_2$(Acetate)$_2$]/Sipernat 50S (component C), Ti-Pure-TiO$_2$ R-900, Disparlon PL-540 leveling agent, and Benzoin leveling agent were intimately mixed in an edge runner mill and the mixture was then homogenized in an extruder at temperatures up to a maximum of 110° C. After cooling, the extrudate was fractionated and ground with a pin mill to a particle size of <100 μm. The powder prepared in this way was applied with an electrostatic powder spraying unit at 60 kV to degreased iron panels to establish film thicknesses of approximately 60 μm, which were then baked in a circulating air drying cabinet at 140° C.

Powder Coating Compositions for Examples 23-24

Amounts in % by Weight

TABLE 29

|  | Example | |
| --- | --- | --- |
|  | 23 | 24 |
| ALBESTER 5040 | 60.29 | 60.29 |
| Araldite PT-810 TGIC | 4.54 | 4.54 |
| Ti-Pure-TiO$_2$ R-900 | 32.45 | 32.45 |
| Disparlon PL-540 | 2.32 | 2.32 |
| Benzoin | 0.40 | 0.40 |
| Zn(1-methylimidazole)$_2$(acetate)$_2$ | 0 | 1.00 |
| Sipernat 50S | 0 | 0.25 |

TABLE 30

| Example | Bake Schedule | MEK Double Rubs |
| --- | --- | --- |
| 23 | 140° C. × 20' | 12 |
| 24 | 140° C. × 20' | 100+ |

Examples 23-24 demonstrate that Zn(1-Methylimidazole)$_2$(Acetate)$_2$ is an effective catalyst for epoxy/acid powder coatings. Even at distinctly lower baking temperatures, completely crosslinked white pigmented coatings were obtained with the powder coating composition according to the invention.

Example 25

Clear Non-Pigmented Powder Coatings Preparation

Clear Non-Pigmented Powder Coatings: EPON 2002 epoxy resin (component A), AMICURE CG-1200 DICY (component B), [Zn(1-Methylimidazole)$_2$(Acetate)$_2$]/Sipernat 50S (component C), and Disparlon PL-540 leveling agent were intimately mixed in an edge runner mill and the mixture was then homogenized in an extruder at temperatures up to a maximum of 110° C. After cooling, the extrudate was fractionated and ground with a pin mill to a particle size of <100 μm. The powder prepared in this way was applied with an electrostatic powder spraying unit at 60 kV to degreased iron panels to establish film thicknesses of approximately 60 μm, which were then baked in a circulating air drying cabinet at 160° C.

Powder Coating Compositions for Example 25

Amounts in % by Weight

TABLE 31

|  | Example 25 |
| --- | --- |
| EPON 2002 Epoxy Resin | 94.00 |
| AMICURE CG-1200 DICY | 4.00 |
| Disparlon PL-540 | 2.00 |
| Zn(1-methylimidazole)$_2$(acetate)$_2$ | 1.00 |
| Sipernat 50S | 0.25 |

TABLE 32

| Example | Bake Schedule | MEK Double Rubs |
| --- | --- | --- |
| 25 | 160° C. × 30' | 100+ |

Example 25 demonstrates that Zn(1-Methylimidazole)$_2$(Acetate)$_2$ is an effective catalyst for epoxy/dicy powder coatings. Even at distinctly lower baking temperatures, completely crosslinked clear non-pigmented coatings were obtained with the powder coating composition according to the invention.

Examples 26-29

Clear Non-Pigmented Powder Coatings Preparation

Clear Non-Pigmented Powder Coatings: ALBESTER 3870 (component A), VESTAGON BF 1320 (component B), [Zn(1-Methylimidazole)$_2$(Acetate)$_2$]/Sipernat 50S (component C), and DISPARLON PL-540 leveling agent, and an acid scavenger (ARALDITE PT-810 or ERISYS GE-30) were intimately mixed in an edge runner mill and the mixture was then homogenized in an extruder at temperatures up to a maximum of 110° C. After cooling, the extrudate was fractionated and ground with a pin mill to a particle size of <50 μm. The powder prepared in this way was applied with an electrostatic powder spraying unit at 60 kV to degreased iron panels to establish film thicknesses of approximately 60 μm, which were then baked in a circulating air drying cabinet at temperatures between 130° and 180° C.

Powder Coating Compositions for Examples 26-29

Amounts in % by Weight

TABLE 33

|  | Example | | | |
| --- | --- | --- | --- | --- |
|  | 26 | 27 | 28 | 29 |
| ALBESTER 3870 | 80.54 | 80.54 | 79.15 | 78.56 |
| VESTAGON BF 1320 | 17.46 | 17.46 | 17.17 | 17.03 |
| DISPALON PL-540 | 2.00 | 2.00 | 2.00 | 2.00 |
| ARALDITE PT-810 | 0 | 0 | 1.68 | 0 |

TABLE 33-continued

| | Example | | | |
|---|---|---|---|---|
| | 26 | 27 | 28 | 29 |
| ERISYS GE-30 | 0 | 0 | 0 | 2.41 |
| Zn(1-methylimidazole)₂(acetate)₂ | 0 | 4.00 | 2.00 | 2.00 |
| Sipernat 50S | 0 | 1.00 | 0.50 | 0.50 |

TABLE 34

| | MEK Double Rubs | | | | | |
|---|---|---|---|---|---|---|
| Example | 130° C. × 20' | 140° C. × 20' | 150° C. × 20' | 160° C. × 20' | 170° C. × 20' | 180° C. × 20' |
| 26 | — | — | — | — | 37 | 178 |
| 27 | — | 66 | 200+ | 200+ | 200+ | 200+ |
| 28 | 99 | 200+ | 200+ | 200+ | 200+ | 200+ |
| 29 | 26 | 200+ | 200+ | 200+ | 200+ | 200+ |

Examples 26-29 demonstrate that even at distinctly lower baking temperatures, completely crosslinked clear non-pigmented coatings were obtained when an acid scavenger was incorporated with the powder coating composition with even a reduced amount of the catalyst according to the invention.

Examples 30-31

Clear Non-Pigmented Powder Coatings Preparation

Clear Non-Pigmented Powder Coatings: EPIKOTE 3003 (component A), EPICURE (component B), [Zn(1-Methylimidazole)₂(Acetate)₂]/Sipernat 50S or 2-Methylimidazole (component C), and Disparlon PL-540 leveling agent were intimately mixed in an edge runner mill and the mixture was then homogenized in an extruder at temperatures up to a maximum of 110° C. After cooling, the extrudate was fractionated and ground with a pin mill to a particle size of <100 μm. The powder prepared in this way was applied with an electrostatic powder spraying unit at 60 kV to degreased iron panels to establish film thicknesses of approximately 60 μm, which were then baked in a circulating air drying cabinet at 180° C.

TABLE 35

| | Examples | |
|---|---|---|
| | 30 | 31 |
| EPIKOTE 3003 | 82.91 | 82.91 |
| EPIKURE 182 | 15.09 | 15.09 |
| Disparlon PL-540 | 2.00 | 2.00 |
| 2-Methylimidazole | 1.00 | 0 |
| Zn(1-methylimidazole)₂(acetate)₂ | 0 | 1.00 |
| Sipernat 50S | 0 | 0.25 |

TABLE 36

| Example | Bake Schedule | MEK Double Rubs |
|---|---|---|
| 30 | 180° C. × 6' | 82 |
| 31 | 180° C. × 6' | 200+ |

Examples 30-31 demonstrate that Zn(1-Methylimidazole)₂(Acetate)₂ is an effective catalyst for epoxy/phenolic powder coatings. Even at distinctly lower baking temperatures, completely crosslinked clear non-pigmented coatings were obtained with the powder coating composition according to the invention.

What is claimed is:

1. A coating composition comprising:
   a. a binder having hydroxyl groups;
   b. an aromatic or aliphatic isocyanate hardener; and
   c. a complex of formula M(amidine)₂(carboxylate)ₓ, wherein
      (i) "M" is a metal selected from the group consisting of zinc, bismuth, aluminum, and zirconium;
      (ii) "amidine" is an amidine compound of formula I, II or III;

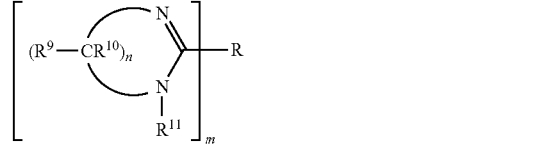

wherein:
R¹ is hydrogen, an organic group attached through a carbon atom, an amine group which is optionally substituted, or a hydroxyl group which is optionally etherified with a hydrocarbyl group having up to 8 carbon atoms;
R² and R³ are each independently hydrogen or an organic group attached through a carbon atom or are joined to one another by an N═C—N linkage to form a heterocyclic ring with one or more hetero atoms or a fused bicyclic ring with one or more heteroatoms;
R⁴ is hydrogen, an organic group attached through a carbon atom or a hydroxyl group which can be optionally etherified with a hydrocarbyl group having up to 8 carbon atoms;
R⁵, R⁶, R⁷, and R⁸ are independently hydrogen, alkyl, substituted alkyl, hydroxyalkyl, aryl, aralkyl, cycloalkyl, heterocyclics, ether, thioether, halogen, —N(R)₂, polyethylene polyamines, nitro groups, keto groups, ester groups, or carbonamide groups optionally alkyl substituted with alkyl, substituted alkyl, hydroxyalkyl, aryl, aralkyl, cycloalkyl, heterocycles, ether, thioether, halogen, —N(R)$_2$, polyethylene polyamines, nitro groups, keto groups or ester groups;

$R^9$, $R^{10}$ and $R^{11}$ are independently hydrogen, alkyl, alkenyl or alkoxy of 1 to 36 carbons, cycloalkyl of 6 to 32 carbons, alkylamino of 1 to 36 carbon atoms, cycloalkyl of 5 to 12 carbon atoms, phenyl, hydroxyalkyl, hydroxycycloalkyl of 1 to 20 carbon atoms, methoxyalkyl of 1 to 20 carbon atoms, aralkyl of 7 to 9 carbon atoms, the aralkyl wherein the aryl group is further substituted by alkyl of 1 to 36 carbon atoms, ether, thioether, halogen, —N(R)$_2$, polyethylene polyamines, nitro groups, keto groups, ester groups, or carbonamide groups optionally alkyl substituted with alkyl, substituted alkyl, hydroxyalkyl, aryl, aralkyl, cycloalkyl, heterocyclics, ether, thioether, halogen, —N(R)$_2$, polyethylene polyamines, nitro groups, keto groups or ester groups; and R represents alkyl, alkylene, aryl, aralkyl, cycloalkyl or heterocyclic radical, optionally substituted with halogen, nitro, alkyl, alkoxy or amino, and, when m=1, R is hydrogen or a plurality of radicals optionally joined by hetero atoms O, N or S;

m=1 or 2; and n=2 or 3;

(iii) "carboxylate" is an aliphatic, aromatic or polymeric carboxylate with an equivalent weight of about 45 to about 465; and (iv) "x" is the oxidation state of the metal.

2. The composition of claim 1 wherein the hardener is selected from the group consisting of isophorone diisocyanate, hexamethylene diisocyanate, 2-methylpentane diisocyanate, 2,2,4-trimethylhexamethylene diisocyanate, 2,4,4-trimethylhexamethylene diisocyanate, norbornane diisocyanate, methylenediphenyl diisocyanate, tetramethylxylylene diisocyanate, 4,4'-diisocyanatodicyclohexylmethane, and 1,3-diisocyanato-2(4)-methylcyclohexane.

3. The composition of claim 1 wherein the complex is Zn(1-methylimidazole)$_2$(acetate)$_2$.

4. The composition of claim 1 wherein the complex is Zn(1-methylimidazole)$_2$(2-ethylhexanoate)$_2$.

5. The composition of claim 1 further comprising an acid scavenger wherein the binder and the acid scavenger are present in amounts such that the acid scavenger has about 0.5 to about 2.0 epoxy or nitrogen groups for each carboxyl group present in the binder.

6. The composition of claim 1 wherein the acid scavenger is selected from the group consisting of epoxies, carbodiimides, trialkylorthoformates, amine compounds, and oxazolines.

7. The composition of claim 1 further comprising water.

8. The composition of claim 1 further comprising an organic solvent.

9. The composition of claim 1, wherein the composition is substantially free of amidine.

* * * * *